United States Patent
Sawai et al.

(10) Patent No.: US 9,152,246 B2
(45) Date of Patent: Oct. 6, 2015

(54) INPUT APPARATUS, CONTROL APPARATUS, CONTROL SYSTEM, ELECTRONIC APPARATUS, AND CONTROL METHOD

(75) Inventors: Kunihito Sawai, Kanagawa (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 12/645,732

(22) Filed: Dec. 23, 2009

(65) Prior Publication Data

US 2010/0169824 A1 Jul. 1, 2010

(30) Foreign Application Priority Data

Dec. 25, 2008 (JP) .................................. 2008-331617

(51) Int. Cl.
*G06F 3/01* (2006.01)
*G06F 3/0346* (2013.01)
*G06F 3/0484* (2013.01)
*G06F 3/0485* (2013.01)
*G06F 3/00* (2006.01)

(52) U.S. Cl.
CPC ............ *G06F 3/0346* (2013.01); *G06F 3/0484* (2013.01); *G06F 3/0485* (2013.01)

(58) Field of Classification Search
USPC .......... 715/784, 863, 764; 345/156; 463/8, 39
See application file for complete search history.

(56) References Cited

U.S. PATENT DOCUMENTS

| | | | | |
|---|---|---|---|---|
| 5,453,758 A | * | 9/1995 | Sato | 345/158 |
| 5,454,043 A | * | 9/1995 | Freeman | 382/168 |
| 5,633,657 A | * | 5/1997 | Falcon | 345/157 |
| 5,745,719 A | * | 4/1998 | Falcon | 715/856 |
| 7,254,376 B2 | * | 8/2007 | Park et al. | 455/100 |
| 8,638,989 B2 | * | 1/2014 | Holz | 382/103 |
| 8,649,554 B2 | * | 2/2014 | Markovic et al. | 382/103 |
| 2003/0038894 A1 | * | 2/2003 | Kim | 348/569 |
| 2004/0021694 A1 | * | 2/2004 | Doar | 345/784 |
| 2005/0030279 A1 | * | 2/2005 | Fu | 345/156 |
| 2005/0253806 A1 | * | 11/2005 | Liberty et al. | 345/156 |
| 2006/0250358 A1 | * | 11/2006 | Wroblewski | 345/157 |
| 2008/0158154 A1 | * | 7/2008 | Liberty et al. | 345/158 |
| 2008/0178115 A1 | * | 7/2008 | Yokota | 715/784 |

(Continued)

FOREIGN PATENT DOCUMENTS

| | | |
|---|---|---|
| JP | 04-036794 A | 2/1992 |
| JP | 05-210461 A | 8/1993 |

(Continued)

*Primary Examiner* — Amy Ng
*Assistant Examiner* — Toan Vu
(74) *Attorney, Agent, or Firm* — Wolf, Greenfield & Sacks, P.C.

(57) ABSTRACT

An input apparatus includes a detection section, a change section, and a transmission section. The detection section detects a movement amount of a user operation in an arbitrary direction. The change section changes a ratio of a first movement amount as a movement amount in a first operation direction corresponding to a first direction on a screen to a second movement amount as a movement amount in a second operation direction corresponding to a second direction on the screen different from the first direction, the first movement amount and the second movement amount corresponding to a detection value detected by the detection section. The transmission section transmits the first movement amount and the second movement amount whose ratio has been changed as scroll information of an image displayed on the screen.

17 Claims, 26 Drawing Sheets

(56) References Cited

U.S. PATENT DOCUMENTS

| | | |
|---|---|---|
| 2009/0109245 A1* | 4/2009 | Han ............................ 345/684 |
| 2009/0148198 A1* | 6/2009 | Suzuki et al. ................ 399/301 |
| 2009/0167683 A1* | 7/2009 | Motoe et al. ................. 345/158 |
| 2009/0235207 A1* | 9/2009 | Choi ............................ 715/851 |
| 2009/0309830 A1* | 12/2009 | Yamamoto et al. ........... 345/156 |
| 2010/0251116 A1* | 9/2010 | Rimas-Ribikauskas et al. ............................ 715/702 |
| 2011/0205156 A1* | 8/2011 | Gomez et al. ................. 345/157 |
| 2013/0152012 A1* | 6/2013 | Jarrett et al. ................. 715/784 |

FOREIGN PATENT DOCUMENTS

| | | |
|---|---|---|
| JP | 6-007371 | 1/1994 |
| JP | 2001-056743 | 2/2001 |
| JP | 2004-078720 A | 3/2004 |
| JP | 2006-236163 A | 9/2006 |

* cited by examiner

FIG.18A  FIG.18B
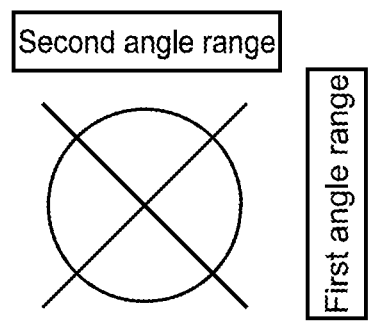
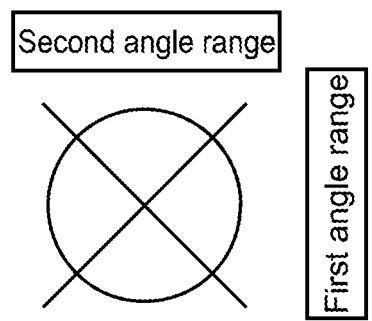
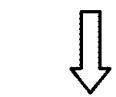
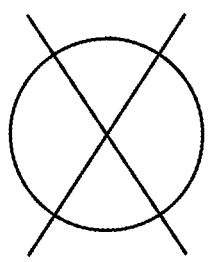
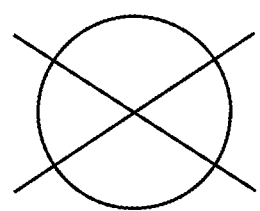
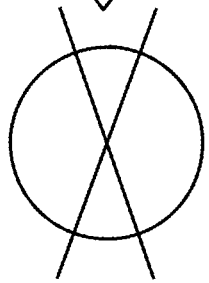
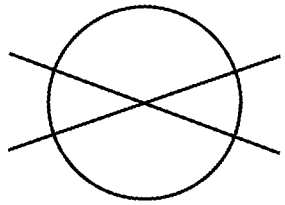
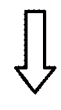
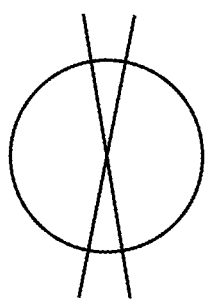
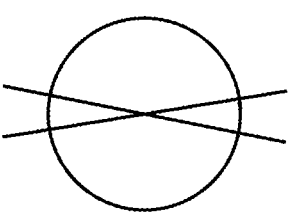

INPUT APPARATUS, CONTROL APPARATUS, CONTROL SYSTEM, ELECTRONIC APPARATUS, AND CONTROL METHOD

BACKGROUND OF THE INVENTION

1. Field of the Invention

The present invention relates to an input apparatus for operating a GUI (Graphical User Interface), a control apparatus for controlling the GUI in accordance with information transmitted from the input apparatus, a control system including those apparatuses, an electronic apparatus, and a control method.

2. Description of the Related Art

Pointing devices, particularly a mouse and a touchpad, are used as controllers for GUIs widely used in PCs (Personal Computers). Not just as HIs (Human Interfaces) of PCs of the related art, the GUIs are now starting to be used as interfaces for AV equipment and game machines used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 (paragraphs (0030) and (0031), FIG. 3; hereinafter, referred to as Patent Document 1) and Japanese Examined Patent Publication No. Hei 6-7371 (P. 3, 11.18-20 on left-hand column; hereinafter, referred to as Patent Document 2)).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a signal as positional information of a cursor or the like displayed by a display means is generated in accordance with the angular velocities. The signal is transmitted to a control apparatus, and the control apparatus controls display so that the cursor moves on a screen in response to the signal.

Patent Document 2 discloses an input apparatus (space mouse) including three acceleration sensors (of three axes) and three angular velocity sensors (of three axes) (gyro).

SUMMARY OF THE INVENTION

With the input apparatuses disclosed in Patent Documents 1 and 2, a cursor is moved on a screen by operating the input apparatus 3-dimensionally. In other words, those input apparatuses are mainly used for moving a cursor.

Incidentally, it is also possible to structure an input apparatus, a control apparatus, and the like so that an image displayed on a screen is scrolled when the input apparatus is operated 3-dimensionally. In this case, the image displayed on the screen is scrolled in accordance with a 3-dimensional operation of the input apparatus.

In this case, however, since the input apparatus is operated in space without any guide, there is a problem that a scroll direction of the image on the screen is not settled if a movement of the input apparatus is converted into scroll as it is, thus leading to a poor operational feeling. For example, even when a user is meaning to move the input apparatus vertically in space, the input apparatus also moves horizontally against a will of the user. As a result, the input apparatus also detects a movement in the horizontal direction in addition to the movement in the vertical direction. If the movement of the input apparatus is converted into scroll as it is in this case, the image on the screen is scrolled in a direction unintended by the user, thus resulting in a problem of a poor operational feeling.

In view of the circumstances as described above, there is a need for an input apparatus, a control apparatus, a control system, an electronic apparatus, and a control method that are capable of improving an operational feeling in scrolling an image displayed on a screen.

According to an embodiment of the present invention, there is provided an input apparatus including a detection means, a change means, and a transmission means.

The detection means detects a movement amount of a user operation in an arbitrary direction.

The change means changes a ratio of a first movement amount as a movement amount in a first operation direction corresponding to a first direction on a screen to a second movement amount as a movement amount in a second operation direction corresponding to a second direction on the screen different from the first direction, the first movement amount and the second movement amount corresponding to a detection value detected by the detection means.

The transmission means transmits the first movement amount and the second movement amount whose ratio has been changed as scroll information of an image displayed on the screen.

In the embodiment of the present invention, since the ratio of the first movement amount to the second movement amount is changed, a scroll direction of the image can be biased in directions such as a horizontal-axis direction and a vertical-axis direction on the screen. As a result, an image can be prevented from being scrolled in a direction unintended by a user on the screen, with the result that an operational feeling for the user in scrolling an image can be improved.

The input apparatus may further include a judgment means.

The judgment means judges a direction of the user operation based on the detected detection value.

In this case, the change means may change the ratio of the first movement amount to the second movement amount in accordance with the judged direction of the user operation.

With this structure, the scroll direction of the image can be biased appropriately in accordance with a direction of the user operation.

In the input apparatus, the change means may change the ratio of the first movement amount to the second movement amount so that a scroll direction of the image is biased in at least the first direction on the screen and the second direction on the screen.

Since the scroll direction of the image can be biased in the first direction and the second direction on the screen in the embodiment of the present invention, an operational feeling in scrolling an image can be additionally improved.

In the input apparatus, the change means may change the ratio so that, when the judged direction of the user operation is within a first angle range from the first operation direction, the scroll direction is biased in the first direction, and change the ratio so that, when the judged direction of the user operation is within a second angle range from the second operation direction, the scroll direction is biased in the second direction.

Assuming that, for example, the first angle range is ±45 degrees from the first operation direction and the second angle range is ±45 degrees from the second operation direction, if a direction of the user operation is within ±45 degrees from the first operation direction, the scroll direction can be biased in the first direction on the screen. On the other hand, if the direction of the user operation is within ±45 degrees from the second operation direction, the scroll direction can be biased in the second direction on the screen.

The input apparatus may further include an angle range control means.

The angle range control means variably controls the first angle range and the second angle range.

In the input apparatus, the angle range control means may variably control the first angle range and the second angle range in accordance with the direction of the user operation.

With this structure, the first angle range and the second angle range can be changed appropriately in accordance with a direction of the user operation.

In the input apparatus, the angle range control means may control the first angle range and the second angle range so that the first angle range is widened when the direction of the user operation is within a first modified angle range from the first operation direction and the second angle range is widened when the direction of the user operation is within a second modified angle range from the second operation direction.

With this structure, when an input operation is made in a direction biased in the first operation direction corresponding to the first direction on the screen (direction within first modified angle range), an image is easily scrolled in the first direction on the screen, whereas it becomes difficult to scroll the image in the second direction on the screen. On the other hand, when an input operation is made in a direction biased in the second operation direction corresponding to the second direction on the screen (direction within second modified angle range), an image is easily scrolled in the second direction on the screen, whereas it becomes difficult to scroll the image in the first direction on the screen. As described above, in the embodiment of the present invention, since the first angle range and the second angle range can be changed appropriately in accordance with a direction of the user operation, an operational feeling for the user in scrolling an image can be additionally improved.

In the input apparatus, the second angle range may be wider than the first angle range.

With this structure, when an input operation is made in an oblique direction with respect to the first operation direction and the second operation direction (e.g., direction at angle of 45 degrees from second operation direction), scroll in the second direction is prioritized over the first direction. As a result, an operational feeling in scrolling an image that is long in the second direction on the screen as described above, for example, can be improved.

In the input apparatus, the change means may change the ratio of the first movement amount to the second movement amount so that the scroll direction of the image is restricted to at least the first direction on the screen and the second direction on the screen.

In the input apparatus, the change means may change the ratio of the first movement amount to the second movement amount so that the scroll direction of the image is restricted to directions that respectively form predetermined angles with respect to the first direction on the screen and the second direction on the screen.

In the input apparatus, the detection means may be a sensor that detects the user operation in space.

According to an embodiment of the present invention, there is provided a control apparatus controlling display of scroll of an image displayed on a screen in accordance with information transmitted from an input apparatus including a detection means for detecting a movement amount of a user operation in an arbitrary direction and a transmission means for transmitting the information on a related value related to a detection value detected by the detection means, the control apparatus including a reception means, a change means, and a display control means.

The reception means receives the information.

The change means changes a ratio of a first movement amount as a movement amount in a first operation direction corresponding to a first direction on the screen to a second movement amount as a movement amount in a second operation direction corresponding to a second direction on the screen different from the first direction, the first movement amount and the second movement amount corresponding to the detected detection value.

The display control means controls the display on the screen so that the image displayed on the screen is scrolled in accordance with the first movement amount and the second movement amount whose ratio has been changed.

The "related value related to a detection value" may be a detection value itself or an operational value calculated based on the detection value.

In the embodiment of the present invention, since the ratio of the first movement amount to the second movement amount is changed, a scroll direction of the image can be biased in directions including the first direction and the second direction on the screen. As a result, an image can be prevented from being scrolled in a direction unintended by the user on the screen, with the result that an operational feeling for the user in scrolling an image can be improved.

According to an embodiment of the present invention, there is provided a control system including an input apparatus and a control apparatus.

The input apparatus includes a detection means, a change means, and a transmission means.

The detection means detects a movement amount of a user operation in an arbitrary direction.

The change means changes a ratio of a first movement amount as a movement amount in a first operation direction corresponding to a first direction on a screen to a second movement amount as a movement amount in a second operation direction corresponding to a second direction on the screen different from the first direction, the first movement amount and the second movement amount corresponding to a detection value detected by the detection means.

The transmission means transmits the first movement amount and the second movement amount whose ratio has been changed as scroll information of an image displayed on the screen.

The control apparatus includes a reception means and a display control means.

The reception means receives the scroll information.

The display control means controls display on the screen so that the image displayed on the screen is scrolled in accordance with the first movement amount and the second movement amount whose ratio has been changed.

According to another embodiment of the present invention, there is provided a control system including an input apparatus and a control apparatus.

The input apparatus includes a detection means and a transmission means.

The detection means detects a movement amount of a user operation in an arbitrary direction.

The transmission means transmits information on a related value related to a detection value detected by the detection means.

The control apparatus includes a reception means, a change means, and a display control means.

The reception means receives the information.

The change means changes a ratio of a first movement amount as a movement amount in a first operation direction corresponding to a first direction on a screen to a second movement amount as a movement amount in a second operation direction corresponding to a second direction on the screen different from the first direction, the first movement amount and the second movement amount corresponding to the detected detection value.

The display control means controls display on the screen so that an image displayed on the screen is scrolled in accordance with the first movement amount and the second movement amount whose ratio has been changed.

According to an embodiment of the present invention, there is provided an electronic apparatus including a display section, a detection means, a change means, and a display control means.

The display section displays a screen.

The detection means detects a movement amount of a user operation in an arbitrary direction.

The change means changes a ratio of a first movement amount as a movement amount in a first operation direction corresponding to a first direction on the screen to a second movement amount as a movement amount in a second operation direction corresponding to a second direction on the screen different from the first direction, the first movement amount and the second movement amount corresponding to a detection value detected by the detection means.

The display control means controls display on the screen so that an image displayed on the screen is scrolled in accordance with the first movement amount and the second movement amount whose ratio has been changed.

According to an embodiment of the present invention, there is provided a control method including detecting a movement amount of a user operation in an arbitrary direction.

A ratio of a first movement amount as a movement amount in a first operation direction corresponding to a first direction on a screen to a second movement amount as a movement amount in a second operation direction corresponding to a second direction on the screen different from the first direction is changed, the first movement amount and the second movement amount corresponding to a detection value detected.

Display on the screen is controlled so that an image displayed on the screen is scrolled in accordance with the first movement amount and the second movement amount whose ratio has been changed.

According to an embodiment of the present invention, there is provided an input apparatus including a detection section, a change section, and a transmission section.

The detection section detects a movement amount of a user operation in an arbitrary direction.

The change section changes a ratio of a first movement amount as a movement amount in a first operation direction corresponding to a first direction on a screen to a second movement amount as a movement amount in a second operation direction corresponding to a second direction on the screen different from the first direction, the first movement amount and the second movement amount corresponding to a detection value detected by the detection section.

The transmission section transmits the first movement amount and the second movement amount whose ratio has been changed as scroll information of an image displayed on the screen.

According to an embodiment of the present invention, there is provided a control apparatus controlling display of scroll of an image displayed on a screen in accordance with information transmitted from an input apparatus including a detection means for detecting a movement amount of a user operation in an arbitrary direction and a transmission means for transmitting the information on a related value related to a detection value detected by the detection means, the control apparatus including a reception section, a change section, and a display control section.

The reception section receives the information.

The change section changes a ratio of a first movement amount as a movement amount in a first operation direction corresponding to a first direction on the screen to a second movement amount as a movement amount in a second operation direction corresponding to a second direction on the screen different from the first direction, the first movement amount and the second movement amount corresponding to the detected detection value.

The display control section controls the display on the screen so that the image displayed on the screen is scrolled in accordance with the first movement amount and the second movement amount whose ratio has been changed.

In the descriptions above, elements described as " . . . means" may be realized by hardware, or may be realized by both software and hardware. In the case of realization by both the software and hardware, the hardware includes at least a storage device for storing a software program.

Typically, the hardware is constituted by selectively using at least one of a sensor, a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a NIC (Network Interface Card), a WNIC (Wireless NIC), a modem, an optical disc, a magnetic disk, and a flash memory.

As described above, according to the embodiments of the present invention, an input apparatus, a control apparatus, a control system, an electronic apparatus, and a control method that are capable of improving an operational feeling in scrolling an image displayed on a screen can be provided.

These and other objects, features and advantages of the present invention will become more apparent in light of the following detailed description of best mode embodiments thereof, as illustrated in the accompanying drawings.

BRIEF DESCRIPTION OF DRAWINGS

FIG. 18 are diagrams showing temporal changes of ranges of the first angle range and the second angle range in a case where the processing shown in FIG. 17 is executed;

DESCRIPTION OF PREFERRED EMBODIMENTS

Hereinafter, embodiments of the present invention will be described with reference to the drawings.

First Embodiment

Figure 1:
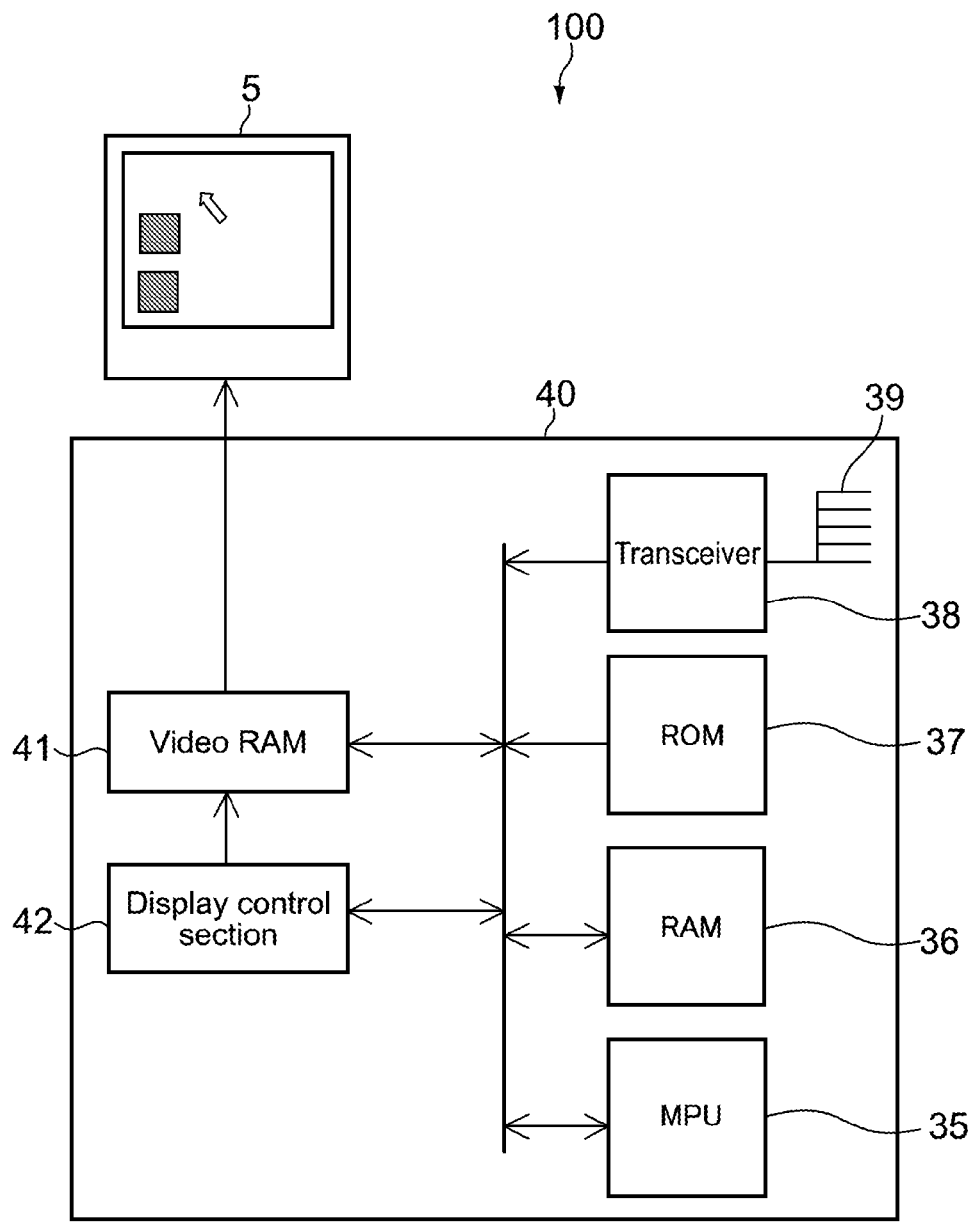
FIG. 1 is a diagram showing a control system according to an embodiment of the present invention.

FIG. 1 is a diagram showing a control system according to a first embodiment of the present invention. A control system 100 includes a display apparatus 5, a control apparatus 40, and an input apparatus 1.

Figure 2:
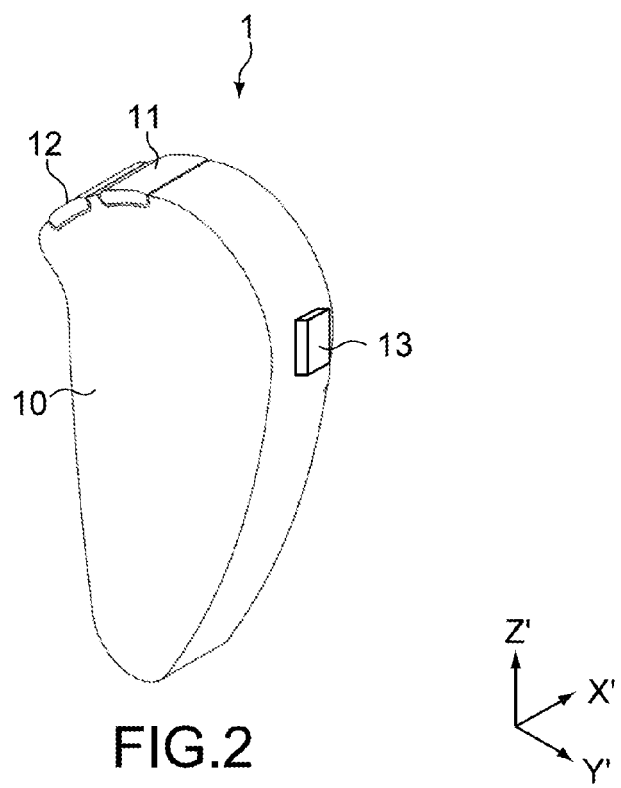
FIG. 2 is a perspective diagram showing an input apparatus.

FIG. 2 is a perspective diagram showing the input apparatus 1. The input apparatus 1 is of a size that a user is capable of holding. The input apparatus 1 includes a casing 10. Further, the input apparatus 1 includes an operation section 23 (see FIG. 6) including a button 11 and a button 12 adjacent to the button 11 that are provided at a center of an upper portion of the casing 10, and a button 13 provided at a side portion of the casing 10.

Typically, the buttons 11, 12, and 13 are each a press-type button. The operation section 23 is not limited to the press-type button, and a bar-type operation section that is operated with one end as a fulcrum, or a slide-type operation section may also be used. Each of the buttons 11, 12, and 13 includes a built-in switch (not shown) which detects an operation of the user with respect to the operation section and outputs an operation signal. As the switch that outputs an operation signal, an optical sensor or a capacitance sensor may be used.

The button 11 has a function corresponding to a left button of a planar-operation-type mouse used for a PC, and the button 12 adjacent to the button 11 has a function corresponding to a right button of a mouse, for example. For example, an operation of selecting an icon 4 (see FIG. 5) may be carried out by clicking the button 11, and an operation of opening a file may be carried out by double-clicking the button 11.

The button 13 has a function as a switch button for switching a pointer mode to a scroll mode and vice versa. The "pointer mode" is a mode in which a pointer 2 displayed on a screen 3 (see FIG. 5) is moved in accordance with a movement of the casing 10. The "scroll mode" is a mode in which an image 6 displayed on the screen 3 is scrolled in accordance with the movement of the casing 10.

Figure 3:
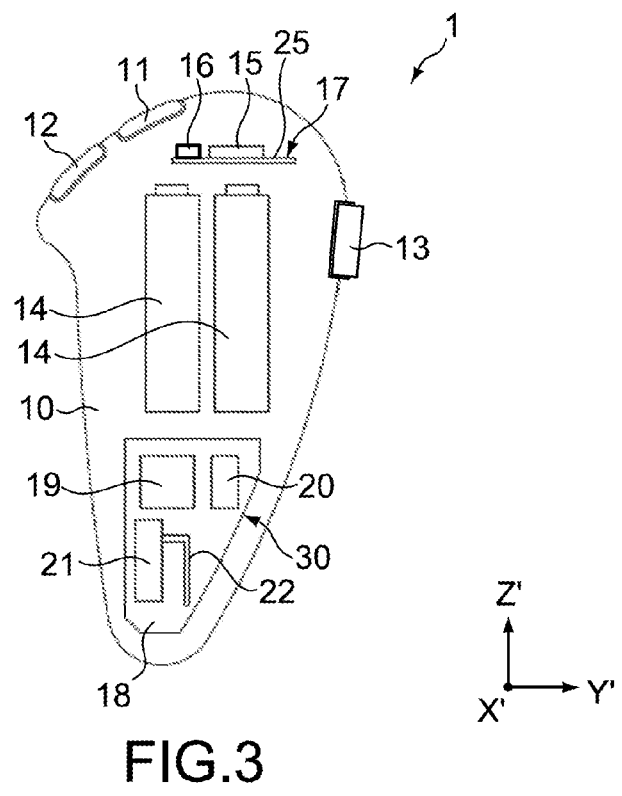
FIG. 3 is a diagram schematically showing an internal structure of the input apparatus.
Figure 4:
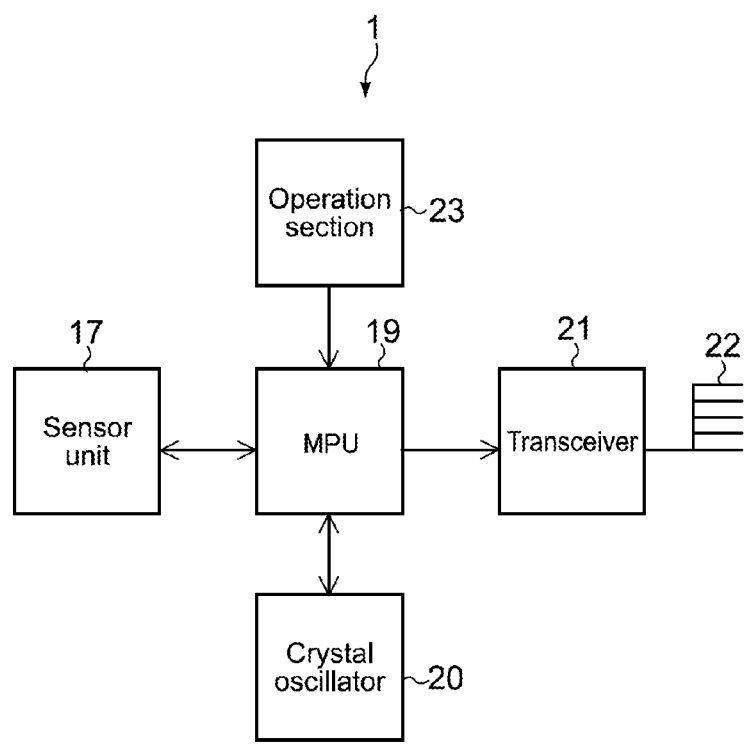
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
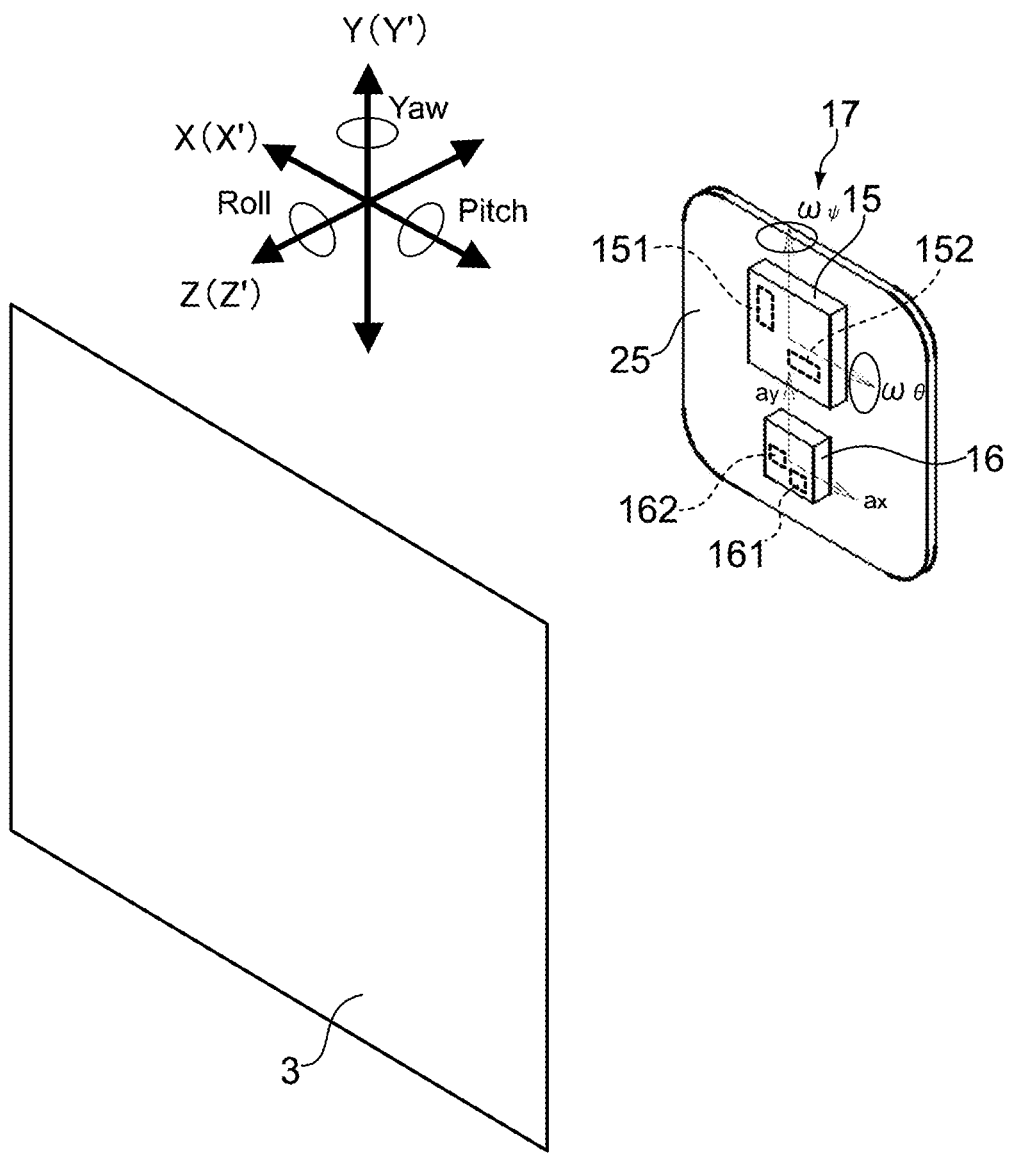
FIG. 8 is a perspective diagram showing a sensor unit.

FIG. 8 is a perspective diagram showing the sensor unit 17.

The sensor unit 17 includes an acceleration sensor unit 16 for detecting accelerations in different angles such as along two orthogonal axes (X' axis and Y' axis). Specifically, the acceleration sensor unit 16 includes two sensors, that is, a first acceleration sensor 161 and a second acceleration sensor 162.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used. Each of the angular velocity sensors 151 and 152 is not limited to the vibration gyro sensor, and a rotary top gyro sensor, a ring laser gyro sensor, a gas rate gyro sensor, a geomagnetic gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X' axis and the Y' axis.

In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Moreover, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section, and the like, and executes various types of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. However, the sensor unit 17 may be a unit that includes the A/D converter.

The transceiver 21 (transmission means) transmits the control signals generated in the MPU 19 as RF radio signals to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a RAM 36, a ROM 37, a video RAM 41, a display control section 42, an antenna 39, and a transceiver 38.

The transceiver 38 receives the control signal transmitted from the input apparatus 1 via the antenna 39 (reception means). The transceiver 38 is also capable of transmitting various predetermined signals to the input apparatus 1. The MPU 35 analyzes the control signal and executes various types of operational processing. The display control section 42 mainly generates screen data to be displayed on the screen 3 of the display apparatus 5 under control of the MPU 35. The video RAM 41 serves as a work area of the display control section 42 and temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display. The display apparatus 5 may alternatively be an apparatus integrally formed with a display and capable of receiving television broadcasts and the like, or an apparatus in which such a display and the control apparatus 40 are integrated.

Figure 5:
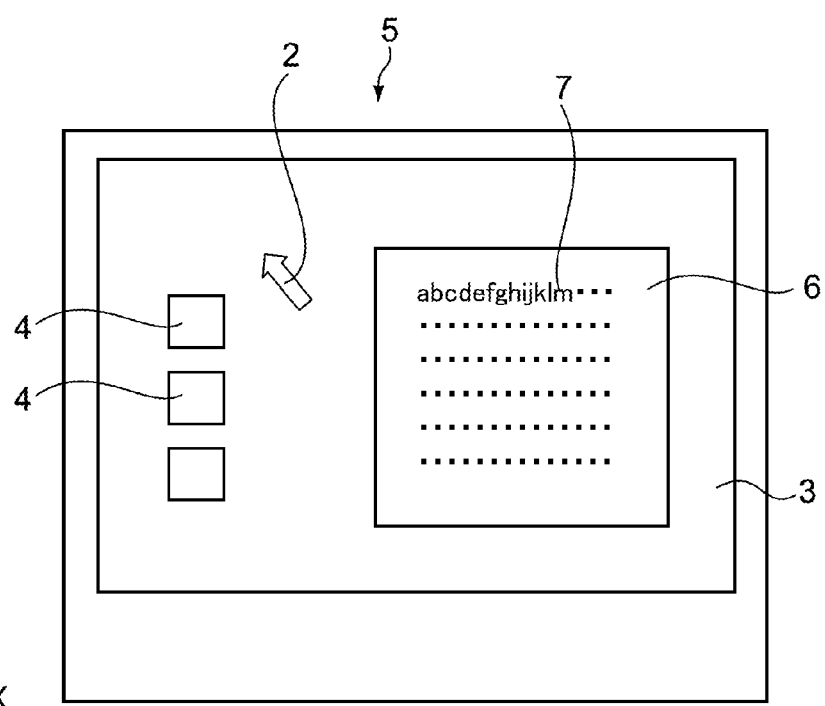
FIG. 5 is a diagram showing an example of a screen displayed on a display apparatus.

FIG. 5 is a diagram showing an example of the screen 3 displayed on the display apparatus 5. GUIs such as icons 4 and the pointer 2 are displayed on the screen 3. The icons are images on the screen 3 representing functions of programs, execution commands, file contents, and the like on the computer. Moreover, on the screen 3, an image 6 such as a web image including a plurality of letters 7 is displayed, for example.

Figure 6:
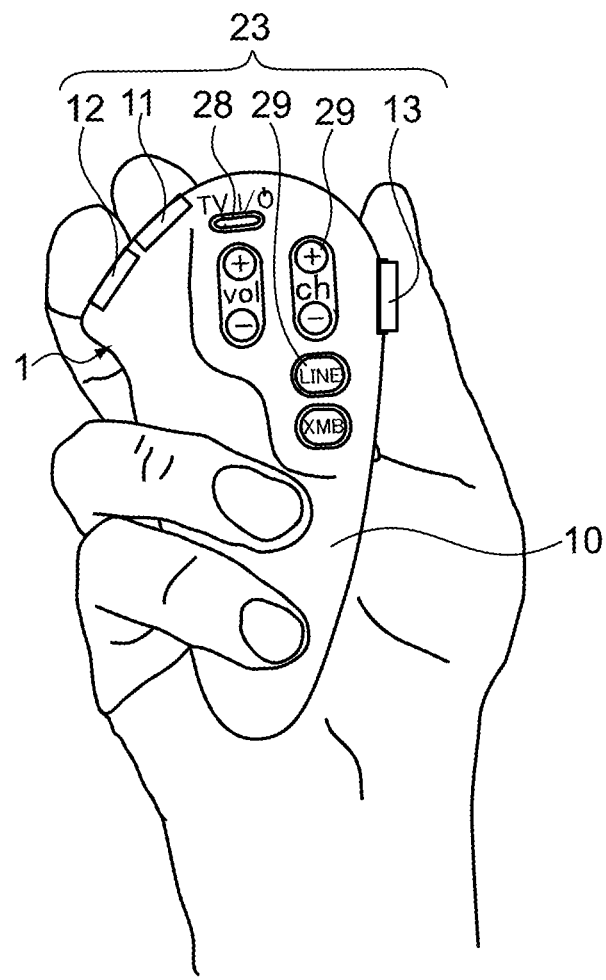
FIG. 6 is a diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power switch 28, for example. Command signals generated when the user moves the input apparatus 1 in the air or operates the operation section 23 while holding the input apparatus 1 as shown in the figure are output to the control apparatus 40, and the control apparatus 40 controls the GUI.

Next, a description will be given on typical examples of ways of moving the input apparatus 1 and ways the pointer 2 moves on the screen 3 accordingly. FIG. 7 are explanatory diagrams therefor.

Figure 7A:
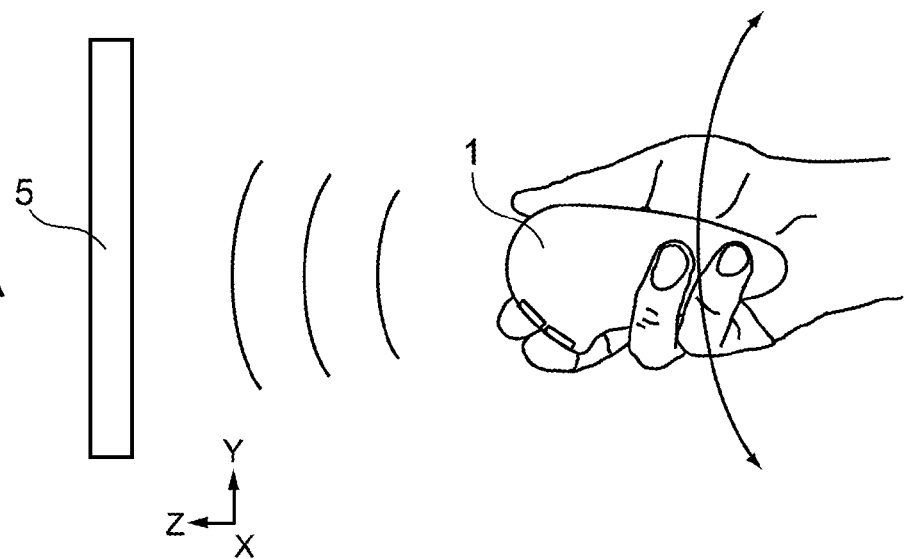
FIG. 7 are explanatory diagrams showing typical examples of ways of moving the input apparatus and ways a pointer moves on a screen accordingly.
Figure 7B:
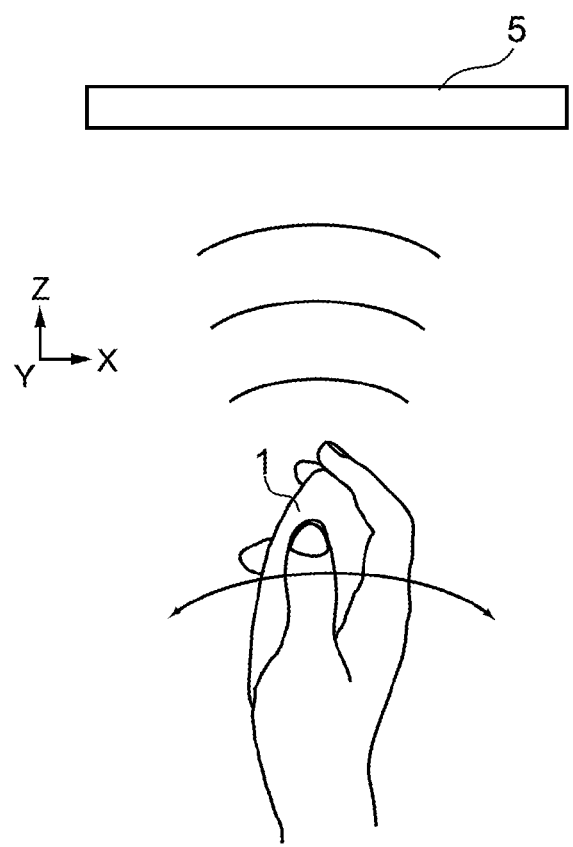

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 8) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B is referred to as reference position.

As shown in FIG. 7A, when the user moves a wrist or an arm in the vertical direction, that is, the pitch direction from the reference position, the second acceleration sensor 162 detects an acceleration $a_y$ in the Y'-axis direction and the second angular velocity sensor 152 detects an angular velocity $\omega_\theta$ about the X' axis. Based on those physical amounts, the control apparatus 40 controls display of the pointer 2 so as to move the pointer 2 in the vertical direction on the screen 3.

Meanwhile, as shown in FIG. 7B, when the user moves the wrist or the arm in the lateral direction, that is, the yaw direction from the reference position, the first acceleration sensor 161 detects an acceleration $a_x$ in the X'-axis direction and the first angular velocity sensor 151 detects an angular velocity $\omega_\psi$ about the Y' axis. Based on the thus-detected physical amounts, the control apparatus 40 controls display of the pointer 2 so as to move the pointer 2 in the horizontal direction on the screen 3.

(Description on Operation)

Next, an operation of the control system 100 structured as described above will be described.

Figure 9:
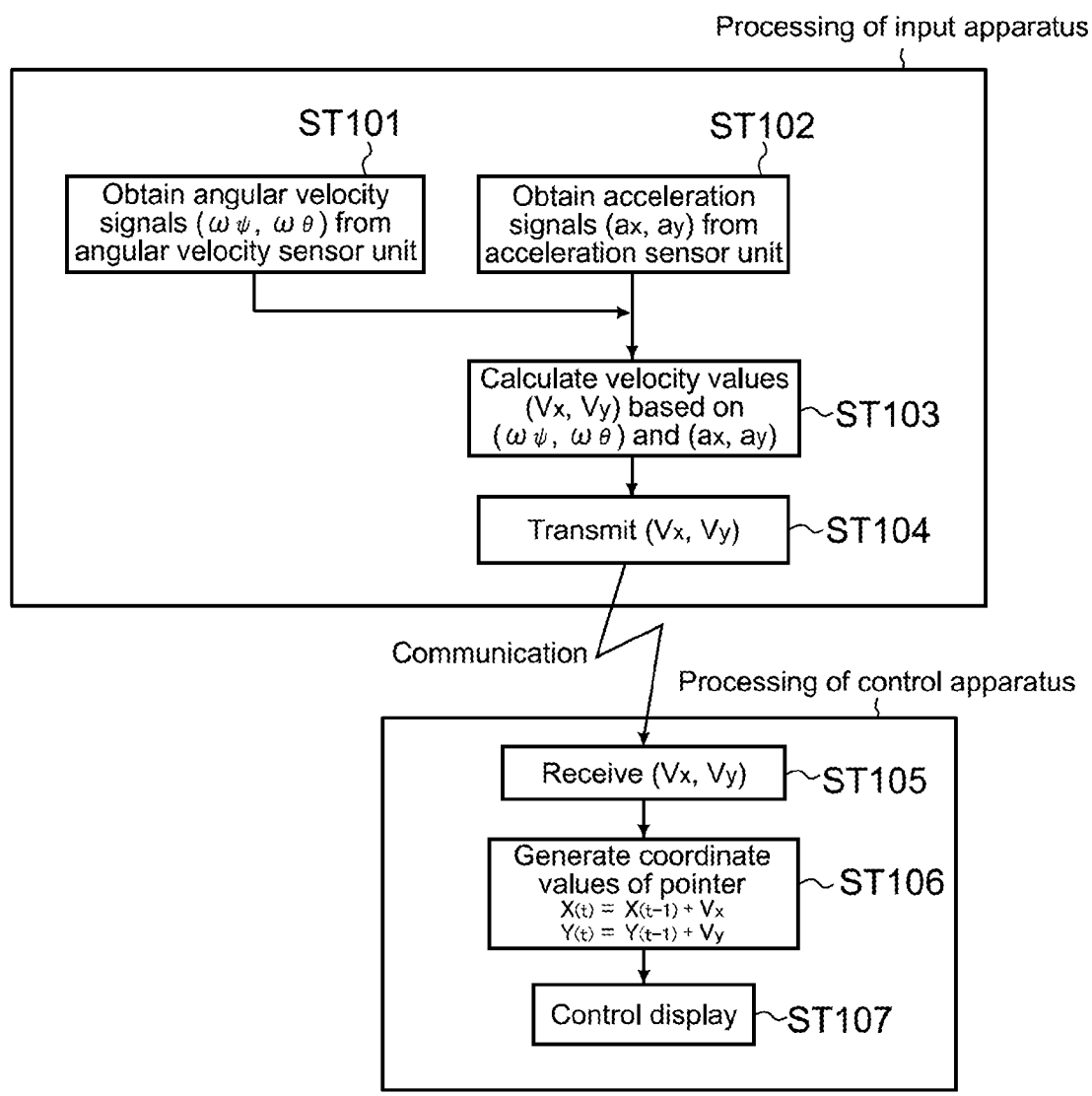
FIG. 9 is a diagram for explaining an operation of the control system that is carried out when the pointer moves on the screen in accordance with a 3-dimensional operation made by the user (pointer mode)

First, an operation of the control system 100 in a case where the pointer 2 moves on the screen 3 in accordance with a 3-dimensional operation made by the user (pointer mode) will be described briefly. FIG. 9 is a flowchart showing the operation of the control system 100 in this case.

As shown in FIG. 9, when the user presses the power supply switch 28 and the power of the input apparatus 1 is thus turned on, for example, biaxial angular velocity signals are output from the angular velocity sensor unit. The MPU 19 acquires angular velocity values ($\omega_\psi$, $\omega_\theta$) from the angular velocity signals (Step 101).

Further, upon turning on the power of the input apparatus 1, biaxial acceleration signals are output from the acceleration sensor unit 16. The MPU 19 acquires acceleration values ($a_x$, $a_y$) from the biaxial acceleration signals (Step 102).

The MPU 19 typically carries out the process of acquiring angular velocity values ($\omega_\psi$, $\omega_\theta$) (Step 101) and the process of acquiring acceleration values ($a_x$, $a_y$) (Step 102) in sync. However, the process of acquiring angular velocity values ($\omega_\psi$, $\omega_\theta$) and the process of acquiring acceleration values ($a_x$, $a_y$) do not always need to be carried out in sync (at the same time). For example, the acceleration values ($a_x$, $a_y$) may be obtained after the angular velocity values ($\omega_\psi$, $\omega_\theta$) are obtained, or the angular velocity values ($\omega_\psi$, $\omega_\theta$) may be obtained after the acceleration values ($a_x$, $a_y$) are obtained.

Based on the acceleration values ($a_x$, $a_y$) and the angular velocity values ($\omega_\psi$, $\omega_\theta$), the MPU 19 calculates velocity values (first velocity value $V_x$ and second velocity value $V_y$) by a predetermined operation (Step 103). The first velocity value $V_x$ is a velocity value in a direction along the X' axis, and the second velocity value $V_y$ is a velocity value in a direction along the Y' axis.

As a method of calculating velocity values, there is a method in which the MPU 19 obtains radius gyrations ($R_\psi$, $R_\theta$) of the movement of the input apparatus 1 by dividing the acceleration values ($a_x$, $a_y$) by angular acceleration values ($\Delta\omega_\psi$, $\Delta\omega_\theta$), and calculates velocity values by multiplying the radius gyrations ($R_\psi$, $R_\theta$) by the angular velocity values ($\omega_\psi$, $\omega_\theta$). Alternatively, the radius gyrations ($R_\psi$, $R_\theta$) may be obtained by dividing acceleration change rates ($\Delta a_x$, $\Delta a_y$) by angular acceleration change rates ($\Delta(\Delta\omega_\psi)$, $\Delta(\Delta\omega_\theta)$). An effect of gravity accelerations can be removed when the radius gyrations ($R_\psi$, $R_\theta$) are calculated by dividing the acceleration change rates ($\Delta a_x$, $\Delta a_y$) by the angular acceleration change rates ($\Delta(\Delta\omega_\psi)$, $\Delta(\Delta\omega_\theta)$).

As another example of the method of calculating the velocity values ($V_x$, $V_y$), there is a method in which the MPU 19 calculates the velocity values by, for example, integrating the acceleration values ($a_x$, $a_y$) while using the angular velocity values ($\omega_\psi$, $\omega_\theta$) as an adjunct for the integration operation.

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated by the calculation method above. For example, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$).

The MPU 19 transmits information on the calculated velocity values ($V_x$, $V_y$) to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined number of clocks, that is, every time a predetermined time passes, so the control apparatus 40 receives the velocity values every predetermined number of clocks.

Upon receiving the velocity values, the MPU 35 of the control apparatus 40 generates new coordinate values (X(t), Y(t)) by adding the velocity values to coordinate values using Equations (1) and (2) below (Step 106). The MPU 35 controls display on the screen so that the pointer 2 moves to a position corresponding to the generated coordinate values (Step 107).

$$X(t)=X(t-1)+V_x \quad (1)$$

$$Y(t)=Y(t-1)+V_y \quad (2)$$

It should be noted that the calculation of the velocity values ($V_x$, $V_y$) may be executed by the control apparatus 40. In this case, the input apparatus 1 transmits information on the angular velocity values ($\omega_\psi$, $\omega_\theta$) and the acceleration values ($a_x$, $a_y$) to the control apparatus 40 via the transceiver 21 and the antenna 22. Based on the information on the angular velocity values ($\omega_\psi$, $\omega_\theta$) and the acceleration values ($a_x$, $a_y$) received via the antenna 39 and the transceiver 38, the control apparatus 40 calculates the velocity values ($V_x$, $V_y$). The method of calculating the velocity values is as described above.

Next, an operation of the input apparatus during the pointer mode and the scroll mode will be described.

Figure 10:
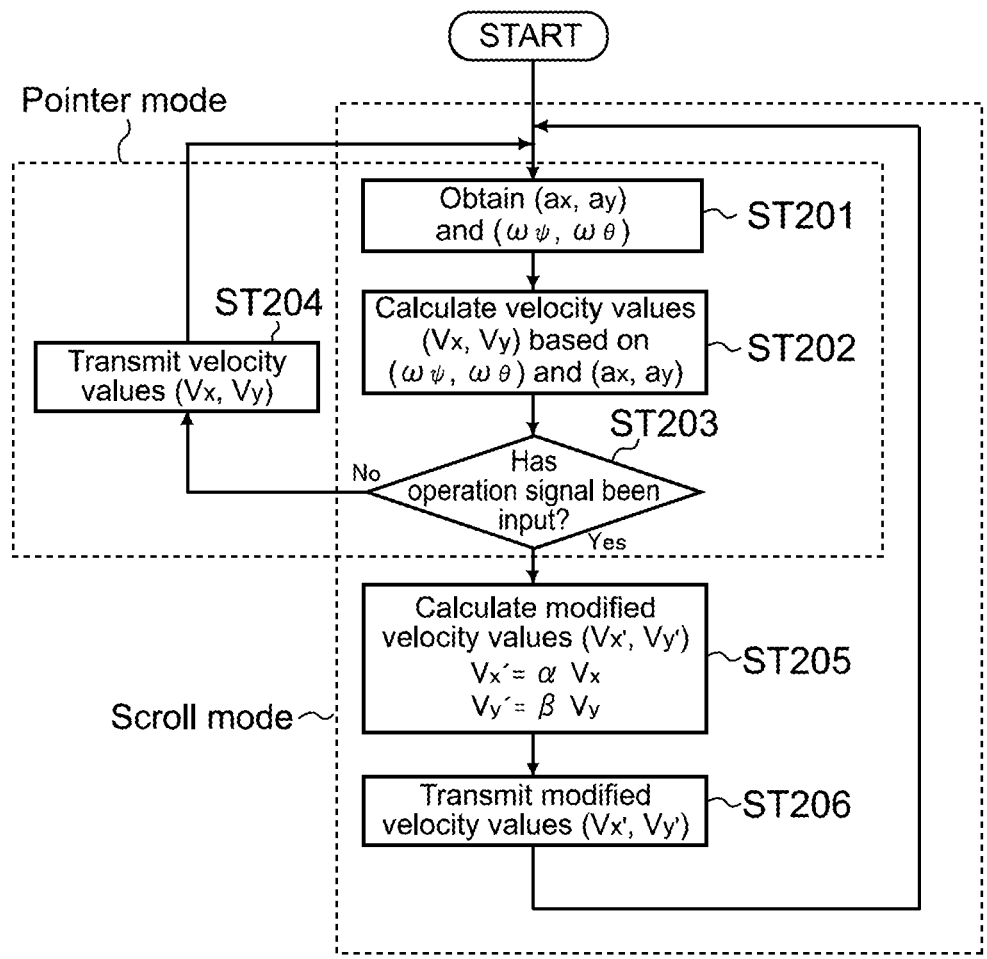
FIG. 10 is a flowchart showing an operation of the input apparatus according to the embodiment of the present invention.

FIG. 10 is a flowchart showing an operation of the input apparatus.

As shown in FIG. 10, the MPU 19 acquires angular velocity values ($\omega_\psi$, $\omega_\theta$) and acceleration values ($a_x$, $a_y$) from the angular velocity sensor unit 15 and the acceleration sensor unit 16 (Step 201). Based on the acquired angular velocity values ($\omega_\psi$, $\omega_\theta$) and acceleration values ($a_x$, $a_y$), the MPU 19 calculates velocity values ($V_x$, $V_y$) (Step 202).

Upon calculating the velocity values ($V_x$, $V_y$), the MPU 19 judges whether an operation signal from a switch (not shown) provided to the button 13 is input (Step 203). When the user has not pressed the button 13 and an operation signal from the switch is not yet input (NO in Step 203), the MPU 19 transmits the calculated velocity values ($V_x$, $V_y$) to the control apparatus 40 as information on a movement amount of the pointer 2 (Step 204). Upon transmitting information on the velocity values ($V_x$, $V_y$), the MPU 19 returns to Step 201.

Upon receiving the information on the velocity values ($V_x$, $V_y$), the MPU 35 of the control apparatus 40 generates new coordinate values and controls display on the screen 3 so that the pointer 2 moves to a position corresponding to the generated coordinate values (pointer mode).

When the user presses the button 13, an operation signal is output from the switch to be input to the MPU 19 (YES in Step 203). Upon being input with the operation signal, the MPU 19 multiplies the first velocity value $V_x$ and the second velocity value $V_y$ by a first weighting factor $\alpha$ and a second weighting factor $\beta$, respectively, as expressed in Equations (3) and (4) below to thus calculate a first modified velocity value $V_x'$ and a second modified velocity value $V_y'$ (Step 205).

$$V_x'=\alpha V_x \quad (3)$$

$$V_y'=\beta V_y \quad (4)$$

Here, the weighting factors ($\alpha$, $\beta$) are typically different values and stored in a memory (not shown), for example. By multiplying the different weighting factors ($\alpha$, $\beta$) to the velocity values ($V_x$, $V_y$), the MPU 19 changes a ratio of the first velocity value $V_x$ to the second velocity value $V_y$ (ratio change means). The weighting factors ($\alpha$, $\beta$) can take various values. By setting the weighting factors ($\alpha$, $\beta$) as appropriate, a scroll direction can be biased in a vertical-axis (Y-axis) direction or a horizontal-axis (X-axis) direction on the screen 3. Details on relationships between the weighting factors ($\alpha$, $\beta$) and scroll tilt directions will be described later.

Upon calculating the modified velocity values ($V_x'$, $V_y'$), the MPU 19 transmits information on the modified velocity values ($V_x'$, $V_y'$) to the control apparatus 40 as scroll information (Step 206). Upon transmitting the information on the modified velocity values ($V_x'$, $V_y'$), the MPU 19 returns to Step 201.

The MPU 35 of the control apparatus 40 receives the transmitted information on the modified velocity values ($V_x'$, $V_y'$). When the image 6 displayed on the screen 3 is in an active state or the pointer 2 is positioned inside the image 6 on the screen 3, for example, the MPU 35 controls display so that the letters 7 inside the image 6 are scrolled at a velocity corresponding to the received modified velocity values $(V_x', V_y')$ (scroll mode). It should be noted that examples of the image 6 as a scroll target include a web image, a map, and an EPG (Electronic Program Guide).

By the processing shown in FIG. 10, by the user operating the input apparatus 3-dimensionally while pressing the button 13, the image 6 displayed on the screen 3 is scrolled in a direction biased in the vertical-axis direction or the horizontal-axis direction.

When the information on the modified velocity values $(V_x', V_y')$ is transmitted in Step 206, a signal transmitted from the input apparatus 1 to the control apparatus 40 contains, in addition to the information on the modified velocity values $(V_x', V_y')$, a signal for causing the control apparatus 40 to control display of scroll. Accordingly, since the control apparatus 40 can distinctively recognize the pointer mode and the scroll mode, display of scroll on the screen can be controlled when the modified velocity values $(V_x', V_y')$ are transmitted. It should be noted that as another method used for the control apparatus 40 to distinctively recognize the pointer mode and the scroll mode, there is a method of transmitting a mode switch signal that indicates that a mode has been switched. Alternatively, the control apparatus 40 can distinctively recognize the pointer mode and the scroll mode also by transmission of a signal indicating that the button 13 has been pressed (e.g., press code). Any method may be adopted for the method used for the control apparatus 40 to distinctively recognize the pointer mode and the scroll mode.

(Relationships Between Weighting Factors ($\alpha$, $\beta$) and Scroll Tilt Directions)

Next, relationships between the weighting factors ($\alpha$, $\beta$) and scroll tilt directions will be described.

FIG. 11 are diagrams for explaining the relationships between the weighting factors ($\alpha$, $\beta$) and scroll tilt directions.

Figure 11A:
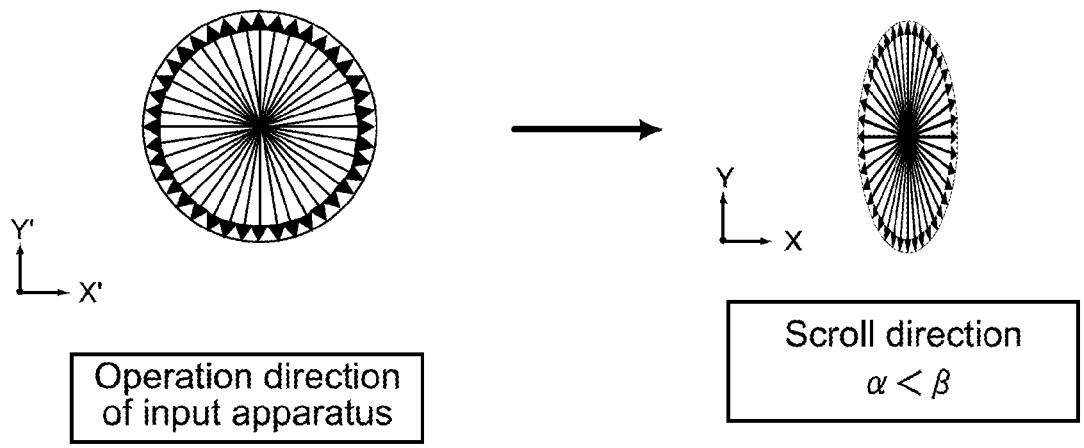
FIG. 11 are diagrams for explaining relationships between weighting factors α and β and scroll tilt directions.

As shown in FIG. 11A, when the first weighting factor $\alpha$ is set to be smaller than the second weighting factor $\beta$, a scroll direction of the image 6 is biased in the vertical-axis (Y-axis) direction on the screen 3 with respect to an operation direction (movement direction) of the input apparatus 1. In this case, the weighting factors ($\alpha$, $\beta$) are set to, for example, (⅓, 1), (½, 1), (½, 2), (½, 3), (1, 2), (1, 3), or (1, 4). The weighting factors ($\alpha$, $\beta$) are not limited to those values and may of course take other values.

By thus setting the first weighting factor $\alpha$ to be smaller than the second weighting factor $\beta$, the scroll direction can be biased in the vertical-axis direction on the screen. Accordingly, an operational feeling in scroll operations can be improved in a case where the image 6 is long in the vertical-axis direction on the screen 3 as a whole, for example. Since the image 6 such as a web image is, in many cases, long in the vertical-axis direction on the screen 3 as a whole in particular, an operational feeling in scrolling the image 6 such as a web image can be improved.

Figure 11B:
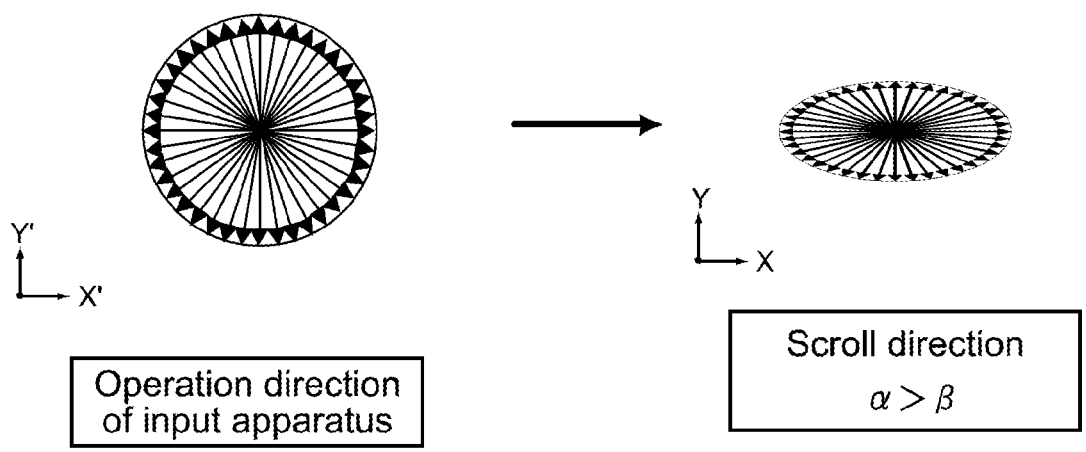

As shown in FIG. 11B, when the first weighting factor $\alpha$ is set to be larger than the second weighting factor $\beta$, the scroll direction of the image 6 is biased in the horizontal-axis (X-axis) direction on the screen 3 with respect to the operation direction of the input apparatus 1.

In this case, the weighting factors ($\alpha$, $\beta$) are set to, for example, (4, 1), (3, 1), (2, 1), (3, ½), (2, ½), (1, ½), or (1, ⅓). The weighting factors ($\alpha$, $\beta$) are not limited to those values and may of course take other values.

By thus setting the first weighting factor $\alpha$ to be larger than the second weighting factor $\beta$, the scroll direction can be biased in the horizontal-axis direction on the screen. Accordingly, an operational feeling in scroll operations can be improved in a case where the image 6 is long in the horizontal-axis direction on the screen 3 as a whole, for example.

Here, it is also possible to set the weighting factors such that either the first weighting factor $\alpha$ or the second weighting factor $\beta$ is set to 0 like (1, 0) and (0, 1).

For example, when the weighting factors ($\alpha$, $\beta$) are (1, 0), the MPU 19 multiplies the first and second velocity values $(V_x, V_y)$ by 1 and 0, respectively, to thus calculate the first and second modified velocity values $(V_x', V_y')$ in Step 205. Then, the MPU 19 transmits information on the calculated modified velocity values $(V_x', V_y')$ to the control apparatus 40 (Step 206). In this case, the image 6 is scrolled only in the vertical-axis direction and not in the horizontal-axis direction on the screen 3. In other words, the scroll direction is restricted to the vertical-axis direction on the screen 3.

Similarly, when the weighting factors ($\alpha$, $\beta$) are (0, 1), for example, the image 6 is scrolled only in the horizontal-axis direction and not in the vertical-axis direction on the screen 3. In other words, the scroll direction is restricted to the horizontal-axis direction on the screen 3.

It should be noted that in the specification, the expression "scroll direction is biased" means that, as shown in FIGS. 11A and 11B, the scroll direction is biased in a predetermined axial direction on the screen 3 (e.g., vertical-axis direction). On the other hand, the expression "scroll direction is restricted" means that the scroll direction is biased at maximum to a predetermined axial direction on the screen and scroll cannot be performed in any other directions.

Next, a description will be given on a case where the weighting factors ($\alpha$, $\beta$) are set such that either the first weighting factor $\alpha$ or the second weighting factor $\beta$ is set to 1 like (0, 1), (½, 1), (1, 2), (2, 1), (1, ½), and (1, 0).

When the weighting factors ($\alpha$, $\beta$) are, for example, (½, 1), the first velocity value $V_x$ is multiplied by ½ and reduced, and a first modified velocity value $V_x'$ is thus obtained (Step 205). Moreover, the second velocity value $V_y$ is multiplied by 1 to thus obtain a second modified velocity value $V_y'$. The value obtained by multiplying the second velocity value $V_y$ by 1 (second modified velocity value $V_y'$) is the second velocity value $V_y$ itself, so the second modified velocity value $V_y'$ does not need to be calculated. In this case, the MPU 19 only needs to transmit the first modified velocity value $V_x'$ and the second velocity value $V_y$ to the control apparatus 40 as scroll information in Step 206.

In other words, when either one of the weighting factors ($\alpha$, $\beta$) is 1, one of the modified velocity values $(V_x', V_y')$ corresponding to one of the velocity values $(V_x, V_y)$ to which 1 is multiplied does not need to be calculated. Accordingly, a calculation amount can be reduced, with the result that power consumption of the input apparatus 1 can be reduced.

The processing shown in FIG. 10 may be mainly executed by the control apparatus 40.

In this case, the control apparatus 40 receives information on velocity values $(V_x, V_y)$ transmitted from the input apparatus 1. Upon receiving the information on the velocity values $(V_x, V_y)$, the MPU 35 of the control apparatus 40 calculates modified velocity values $(V_x', V_y')$ by multiplying the received velocity values $(V_x, V_y)$ by the weighting factors ($\alpha$, $\beta$). Then, the MPU 35 controls display on the screen so that the image displayed on the screen is scrolled at a velocity corresponding to the modified velocity values $(V_x', V_y')$. It should be noted that processing according to embodiments and modified examples of the present invention to be described hereinbelow can all be applied as processing of the control apparatus 40.

Second Embodiment

Next, a second embodiment of the present invention will be described. The first embodiment above has described a case where the scroll direction is biased in (restricted to) a uniaxial direction of one of the horizontal-axis direction and the vertical-axis direction on the screen 3. The second embodiment is different from the first embodiment in that the scroll direction is biased in (restricted to) biaxial directions of the horizontal-axis direction and the vertical-axis direction on the screen 3. Therefore, that point will mainly be described.

Figure 12:
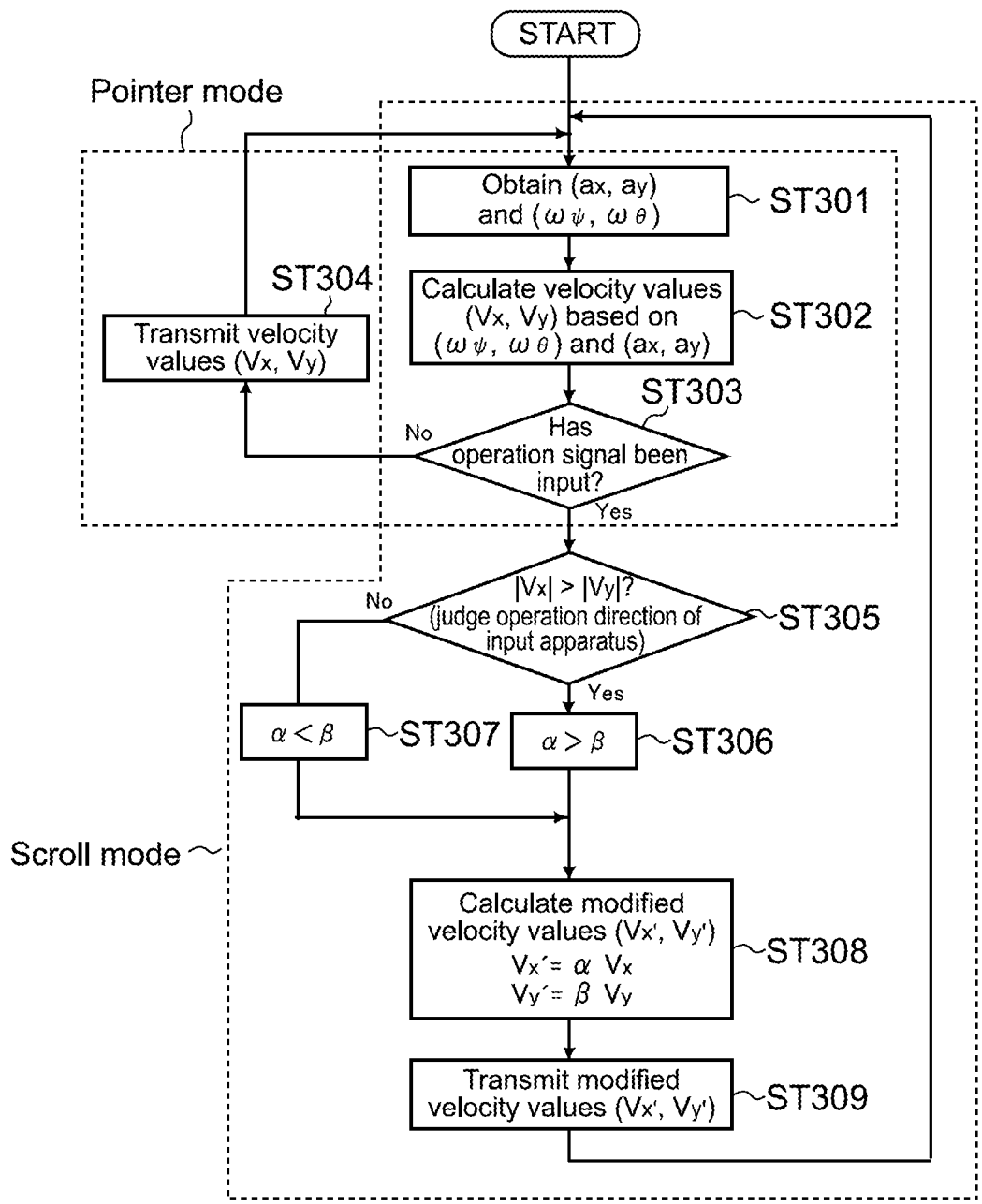
FIG. 12 is a diagram showing an operation of the input apparatus according to another embodiment of the present invention.

FIG. 12 is a flowchart showing an operation of the input apparatus 1 according to the second embodiment.

As shown in FIG. 12, in Steps 301 to 304, processes that are the same as those of Steps 201 to 204 of FIG. 10 are executed. In other words, when judged that the button 13 is not pressed (NO in Step 303), information on velocity values is transmitted from the input apparatus 1 (Step 304), and the pointer 2 displayed on the screen 3 is moved at a velocity corresponding to the velocity values.

When the user presses the button 13, an operation signal is output from the switch provided to the button 13 and input to the MPU 19 (YES in Step 303).

Upon being input with the operation signal, the MPU 19 judges whether an absolute value of the first velocity value $|V_x|$ is larger than an absolute value of the second velocity value $|V_y|$. By comparing the absolute value of the first velocity value $|V_x|$ and the absolute value of the second velocity value $|V_y|$ in Step 305, the MPU 19 judges an operation direction (movement direction) of the input apparatus 1 (judgment means). Specifically, when the absolute value of the first velocity value $|V_x|$ is larger than the absolute value of the second velocity value $|V_y|$, the MPU 19 judges that the input apparatus 1 is being operated in a direction biased in the X'-axis direction. Similarly, when the absolute value of the second velocity value $|V_y|$ is larger than the absolute value of the first velocity value $|V_x|$, the MPU 19 judges that the input apparatus 1 is being operated in a direction biased in the Y'-axis direction.

When judged that the absolute value of the first velocity value $|V_x|$ is larger than the absolute value of the second velocity value $|V_y|$ (YES in Step 305), the MPU 19 sets the first weighting factor α to be larger than the second weighting factor β (Step 306). On the other hand, when judged that the absolute value of the first velocity value $|V_x|$ is smaller than the absolute value of the second velocity value $|V_y|$ (NO in Step 305), the MPU 19 set the first weighting factor α to be smaller than the second weighting factor β (Step 307). Values determined in advance are used as the weighting factors (α, β) set in Steps 306 and 307. For example, the weighting factors (α, β) set in Step 306 are, for example, (1, ½), and the weighting factors (α, β) set in Step 307 are, for example, (½, 1). As other combinations of the weighting factors (α, β) set in Steps 306 and 307, there are, for example, [(1, 0) and (0, 1)], [(1, ⅓) and (⅓, 1)], [(1, 2) and (2, 1)], and [(1, 3) and (3, 1)]. However, the combination is not limited to those combinations, and other values may be used instead.

Upon setting the weighting factors (α, β), the MPU 19 multiplies the first and second velocity values ($V_x$, $V_y$) by the first and second weighting factors (α, β), respectively, to thus calculate first and second modified velocity values ($V_x'$, $V_y'$) (Step 308).

Upon calculating the modified velocity values ($V_x'$, $V_y'$), the MPU 19 transmits information on the modified velocity values ($V_x'$, $V_y'$) to the control apparatus 40 as scroll information (Step 309).

Upon receiving the transmitted information on the modified velocity values ($V_x'$, $V_y'$), the MPU 35 of the control apparatus 40 controls display so that the letters 7 in the image 6 are scrolled at a velocity corresponding to the received modified velocity values ($V_x'$, $V_y'$).

Figure 13A:
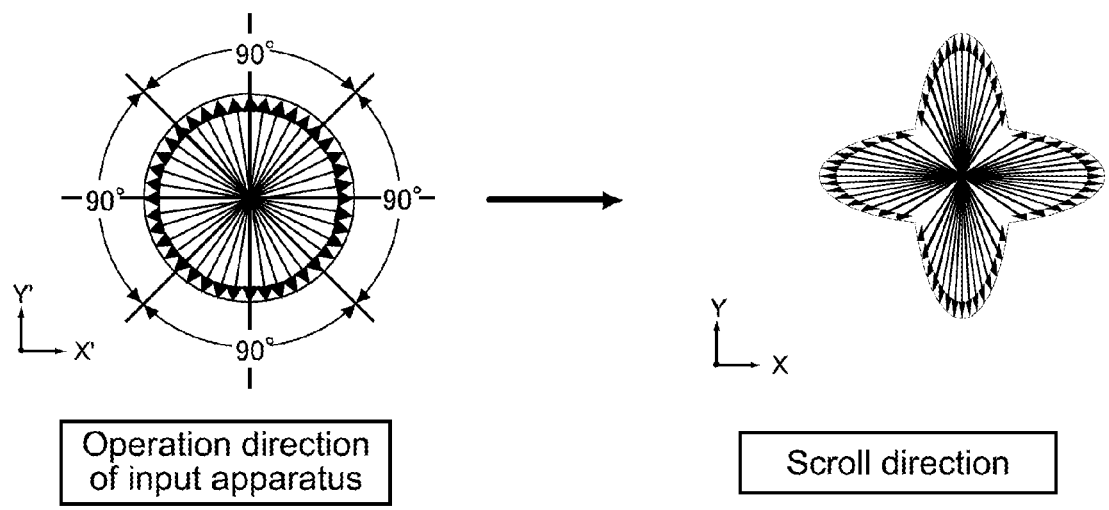
FIG. 13 are diagrams showing relationships between operation directions of the input apparatus and scroll directions in a case where the processing shown in FIG. 12 is executed.
Figure 13B:
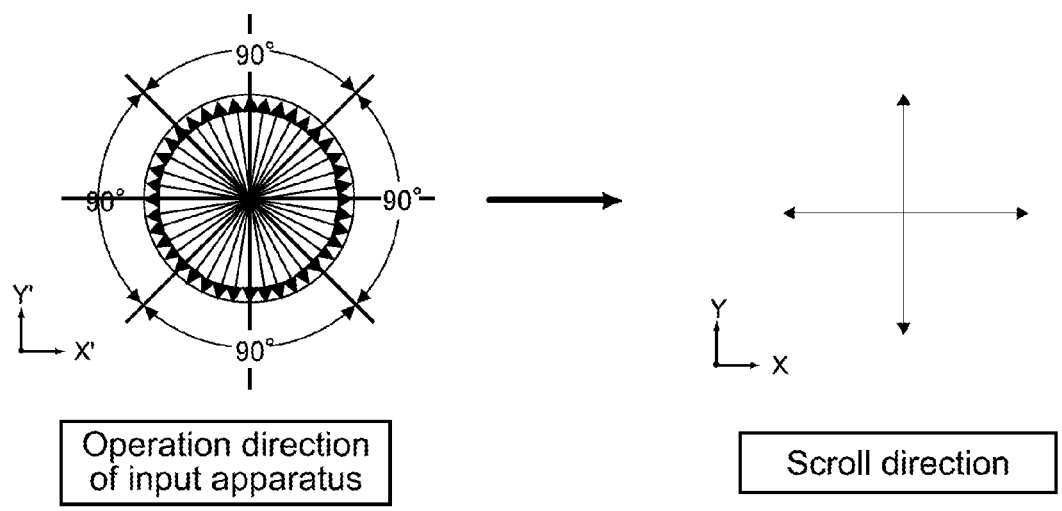

FIG. 13 are diagrams showing relationships between operation directions of the input apparatus 1 and scroll directions in a case where the processing shown in FIG. 12 is executed. FIG. 13A shows relationships between operation directions of the input apparatus 1 and scroll directions in a case where a combination of weighting factors set in Steps 306 and 307 is, for example, [(1, ½) and (½, 1)] or [(2, 1) and (1, 2)]. FIG. 13B shows relationships between operation directions of the input apparatus 1 and scroll directions in a case where 0 (or value that is substantially 0) is used as in [(1, 0) and (0, 1)] and [(2, 0) and (0, 2)], for example.

As shown in FIG. 13A, when the user operates the input apparatus 1 in a direction within an angle range of ±45 degrees from a direction along the X'-axis direction, a scroll direction of an image on the screen 3 is biased in the horizontal-axis (X-axis) direction on the screen. On the other hand, when the user operates the input apparatus 1 in a direction within an angle range of ±45 degrees from a direction along the Y'-axis direction, the scroll direction of the image on the screen 3 is biased in the vertical-axis (Y-axis) direction on the screen.

As shown in FIG. 13B, if 0 is used for the weighting factors (α, β), when the user operates the input apparatus 1 in a direction within an angle range of ±45 degrees from a direction along the X'-axis direction, a scroll direction of the image 6 is restricted to the horizontal-axis (X-axis) direction on the screen. On the other hand, when the user operates the input apparatus 1 in a direction within an angle range of ±45 degrees from a direction along the Y'-axis direction, the scroll direction of the image 6 is restricted to the vertical-axis (Y-axis) direction on the screen.

As described above, since the scroll direction can be biased (restricted) appropriately in accordance with the operation direction of the input apparatus 1 in the input apparatus 1 according to the second embodiment, an operational feeling in scroll operations can be additionally improved.

Third Embodiment

Next, an input apparatus according to a third embodiment of the present invention will be described.

The third embodiment mainly describes points different from those of the second embodiment above.

Figure 14:
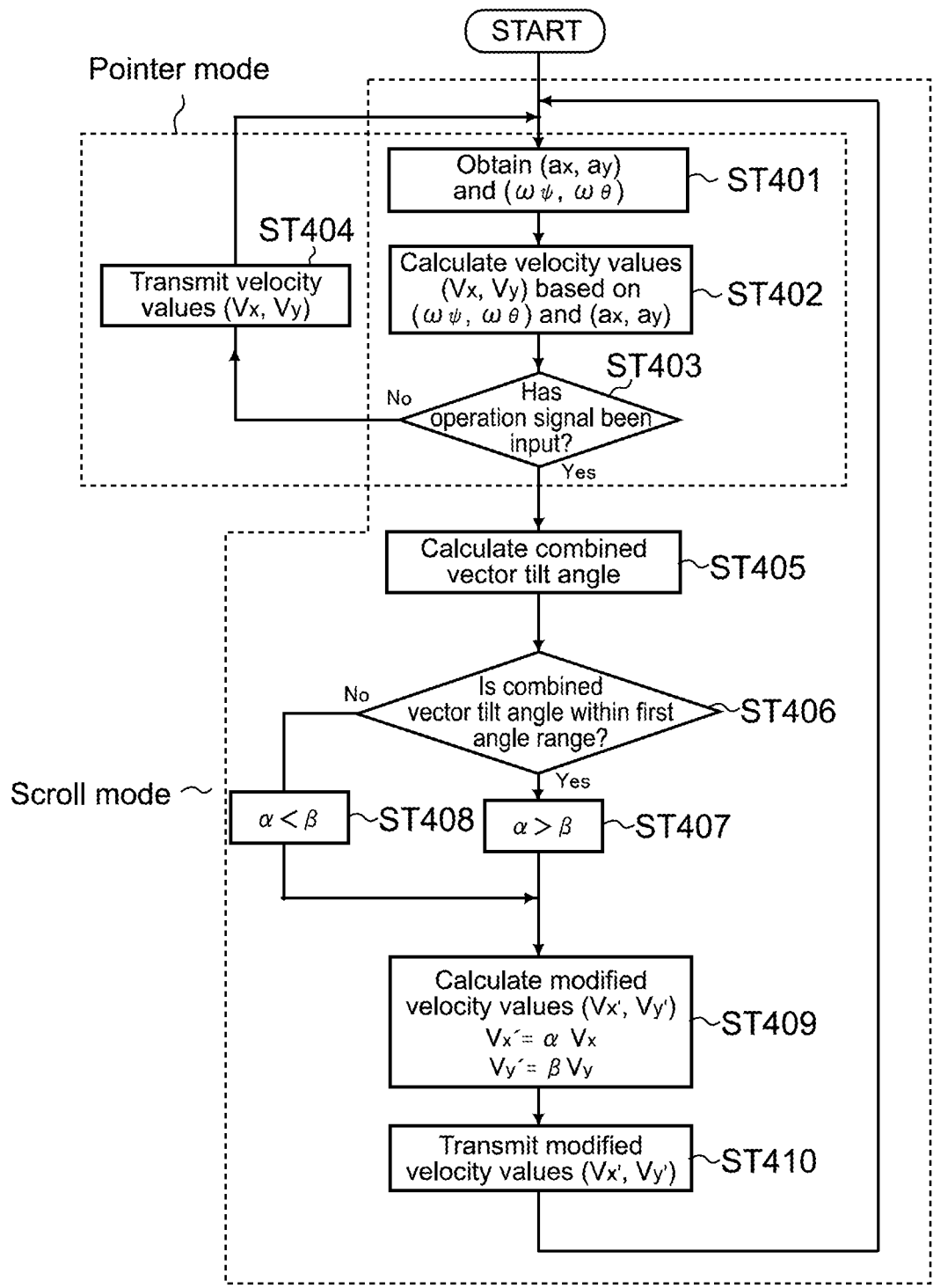
FIG. 14 is a flowchart showing an operation of the input apparatus according to another embodiment of the present invention.

FIG. 14 is a flowchart showing an operation of the input apparatus 1 according to the third embodiment.

As shown in FIG. 14, in Steps 401 to 404, processes that are the same as those of Steps 301 to 304 of FIG. 12 are executed. In this case, by the user operating the input apparatus 1 3-dimensionally in a state where the button 13 is not pressed, the pointer 2 moves on the screen 3 in accordance with the 3-dimensional operation.

When the button 13 is pressed, an operation signal is output from the switch provided to the button 13 and input to the MPU 19 (YES in Step 403). Upon being input with the operation signal, the MPU 19 calculates a tilt angle ξ of a combined vector of the first velocity value and the second velocity value using Equation (5) below (Step 405). By calculating the combined vector tilt angle, the MPU 19 judges an operation direction (movement direction) of the input apparatus 1.

$$\arctan(V_y/V_x)=\xi \quad (5)$$

Upon calculating the combined vector tilt angle ξ the MPU 19 judges whether the combined vector tilt angle ξ is an angle within a first angle range (Step 406).

Now, the first angle range and a second angle range will be described.

Figure 15:
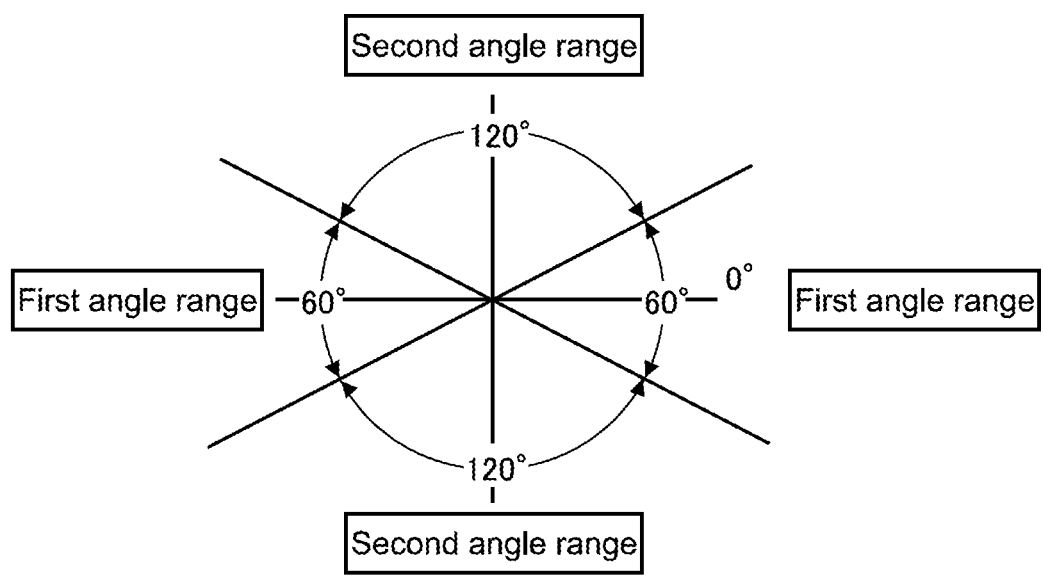
FIG. 15 is a diagram for explaining a first angle range and a second angle range.

FIG. 15 is a diagram for explaining the first angle range and the second angle range.

As shown in FIG. 15, the first angle range indicates a range within a predetermined angle from 0 degree (or 180 degrees; same holds true for descriptions below) (e.g., 0±30 degrees). The second angle range indicates a range within a predetermined angle from 90 degrees (or 270 degrees; same holds true for descriptions below) (e.g., 90±60 degrees). The input apparatus 1 stores the first angle range and the second angle range as shown in FIG. 15 in a memory. The horizontal-axis direction within the angle ranges shown in FIG. 15 corresponds to a movement direction (operation direction) of the input apparatus 1 in the horizontal-axis direction, and the vertical-axis direction corresponds to the movement direction (operation direction) of the input apparatus 1 in the vertical-axis direction.

The first angle range and the second angle range can be set variously, but in the description on FIG. 14, the first angle range is assumed to be an angle range of 0±30 degrees and the second angle range is assumed to be an angle range of 90±60 degrees for convenience.

It should be noted that the MPU 19 may judge whether the combined vector tilt angle ξ is an angle within the second angle range in Step 406.

When judged that the combined vector tilt angle ξ is an angle within the first angle range (YES in Step 406), the MPU 19 sets the first weighting factor α to be larger than the second weighting factor β (Step 407). On the other hand, when judged that the combined vector tilt angle ξ is not an angle within the first angle range (NO in Step 406), the MPU 19 sets the first weighting factor α to be smaller than the second weighting factor β (Step 408).

Upon setting the weighting factors (α, β), the MPU 19 multiplies the first and second velocity values ($V_x$, $V_y$) by the first and second weighting factors (α, β), respectively, to thus calculate first and second modified velocity values ($V_x'$, $V_y'$) (Step 409).

Upon calculating the modified velocity values ($V_x'$, $V_y'$), the MPU 19 transmits information on the modified velocity values ($V_x'$, $V_y'$) to the control apparatus 40 as scroll information (Step 410).

Upon receiving the transmitted information on the modified velocity values ($V_x'$, $V_y'$), the MPU 35 of the control apparatus 40 controls display so that the letters 7 in the image 6 are scrolled at a velocity corresponding to the received modified velocity values ($V_x'$, $V_y'$).

Figure 16A:
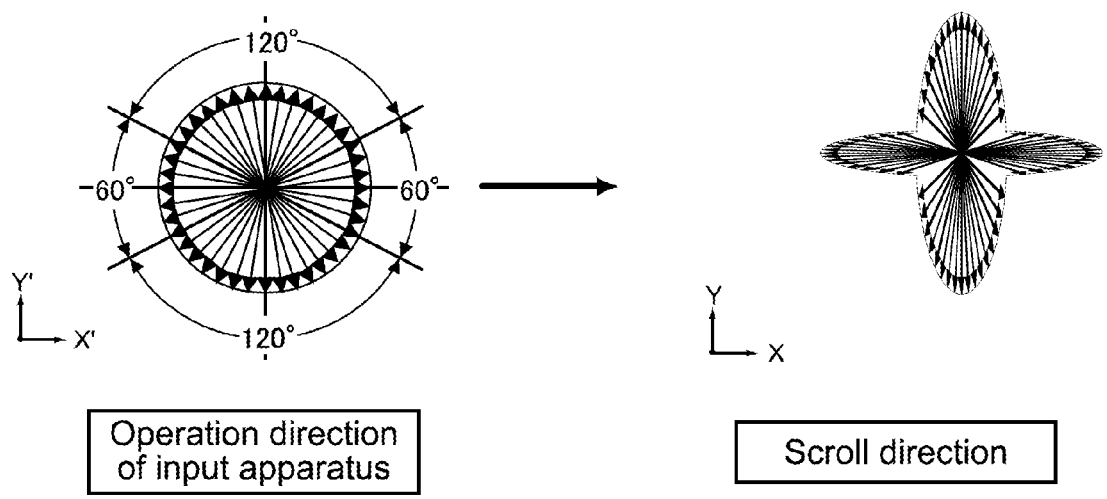
FIG. 16 are diagrams showing relationships between the operation directions of the input apparatus and scroll directions in a case where the processing shown in FIG. 14 is executed.
Figure 16B:
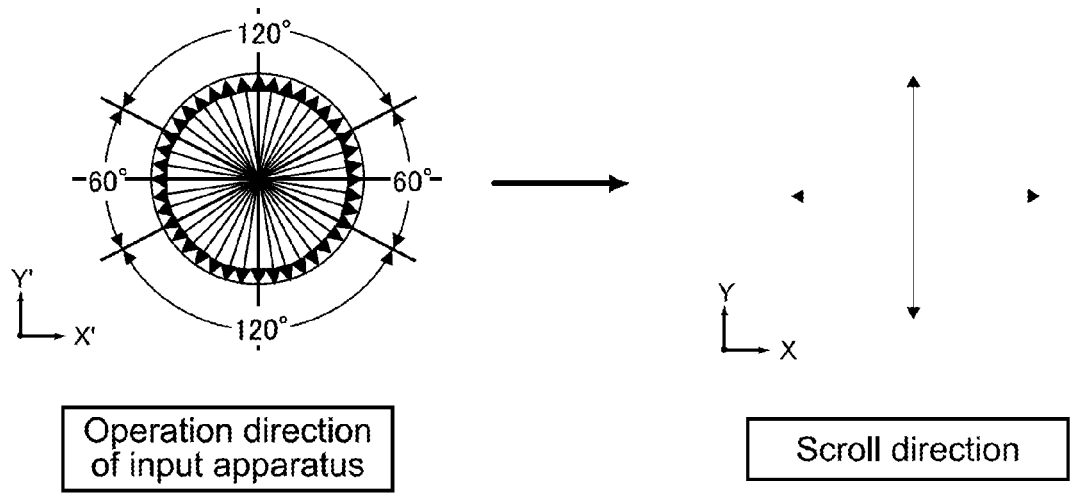

FIG. 16 are diagrams showing relationships between operation directions of the input apparatus 1 and scroll directions in a case where the processing shown in FIG. 14 is executed. FIG. 16A is a diagram showing relationships between operation directions of the input apparatus 1 and scroll directions in a case where a combination of weighting factors set in Steps 407 and 408 is, for example, [(1, ½) and (½, 1)] or [(2, 1) and (1, 2)]. FIG. 16B is a diagram showing relationships between operation directions of the input apparatus 1 and scroll directions in a case where 0 (or value that is substantially 0) is used for the weighting factors (α, β) as in [(1, 0) and (0, 1)] and [(2, 0) and (0, 2)], for example.

As shown in FIG. 16A, when the user operates the input apparatus 1 in a direction within an angle range of ±30 degrees from the direction along the X'-axis direction, a scroll direction of the image on the screen 3 is biased in the horizontal-axis (X-axis) direction on the screen. On the other hand, when the user operates the input apparatus 1 in a direction within an angle range of ±60 degrees from the direction along the Y'-axis direction, the scroll direction of the image on the screen 3 is biased in the vertical-axis (Y-axis) direction on the screen.

As shown in FIG. 16B, if 0 (or value that is substantially 0) is used for the weighting factors (α, β), when the user operates the input apparatus 1 in a direction within an angle range of ±30 degrees from the direction along the X'-axis direction, a scroll direction of the image 6 is restricted to the horizontal-axis (X-axis) direction on the screen. On the other hand, when the user operates the input apparatus 1 in a direction within an angle range of ±60 degrees from the direction along the Y'-axis direction, the scroll direction of the image 6 is restricted to the vertical-axis (Y-axis) direction on the screen 3.

As described above, since the second angle range is set to be larger than the first angle range in the input apparatus 1 according to the third embodiment, the image 6 can be scrolled in the vertical-axis direction on the screen 3 with high sensitivity. As a result, an operational feeling in scroll operations can be additionally improved in a case where the image 6 is long in the vertical-axis direction on the screen 3 as a whole.

Here, the first angle range and the second angle range can be set variously as described above. Examples of the combination of the first angle range and the second angle range include combinations of (0±35 degrees, 90±55 degrees) and (0±40 degrees, 90±50 degrees).

Alternatively, the first angle range may be set to be larger than the second angle range. Examples of the combination of the first angle range and the second angle range in this case include combinations of (0±60 degrees, 90±30 degrees), (0±55 degrees, 90±35 degrees), and (0±50 degrees, 90±40 degrees). When the first angle range is set to be larger than the second angle range, the image 6 can be scrolled in the horizontal-axis direction on the screen 3 with high sensitivity. As a result, an operational feeling in scroll operations can be additionally improved in a case where the image 6 is long in the horizontal-axis direction on the screen 3 as a whole.

Fourth Embodiment

Next, an input apparatus according to a fourth embodiment of the present invention will be described.

The fourth embodiment is different from the third embodiment above in that the first angle range and the second angle range are controlled variably. Therefore, that point will mainly be described.

Figure 17:
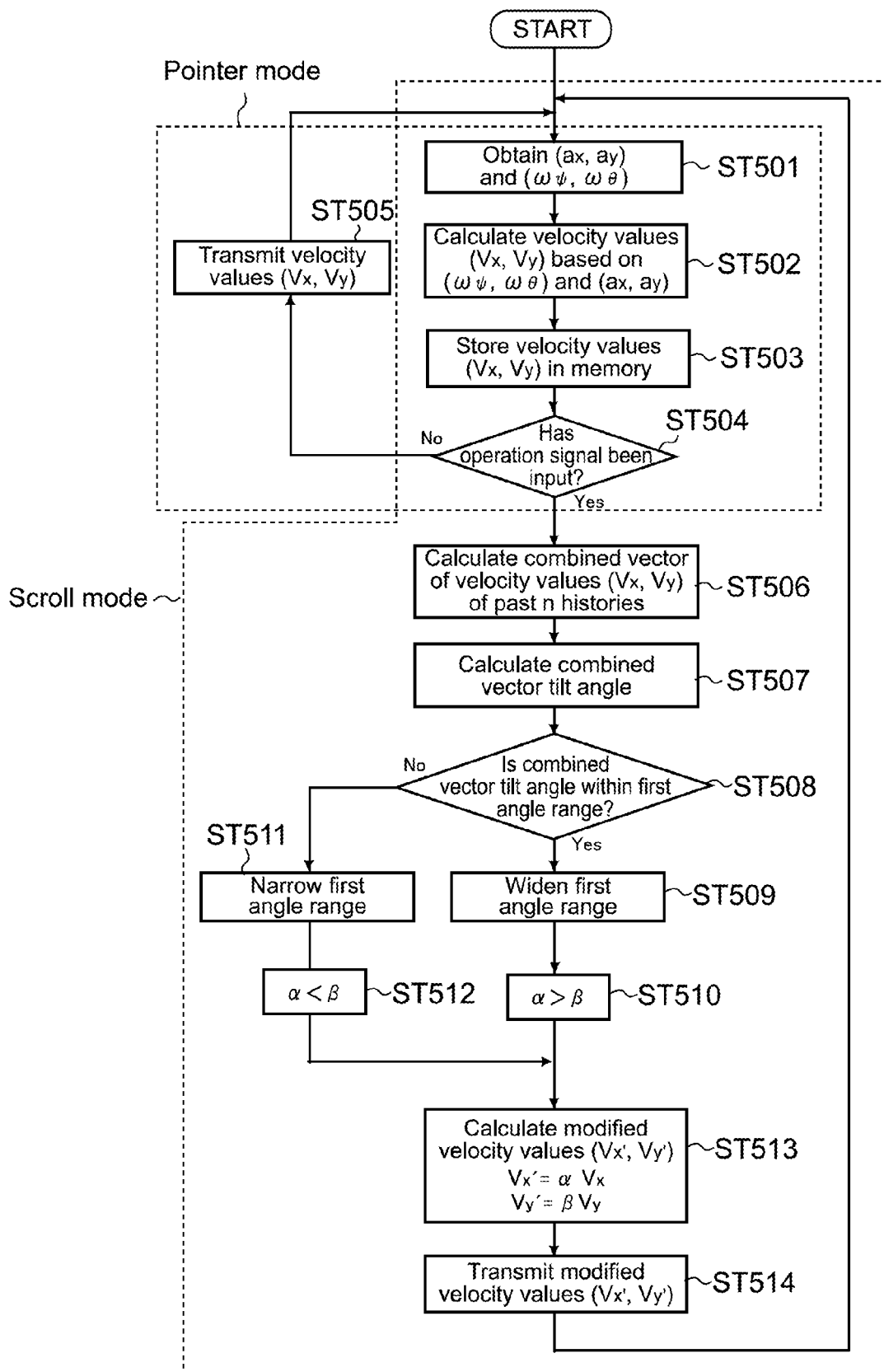
FIG. 17 is a flowchart showing an operation of the input apparatus according to another embodiment of the present invention.

FIG. 17 is a flowchart showing an operation of the input apparatus 1 according to the fourth embodiment.

As shown in FIG. 17, upon calculating velocity values based on acquired acceleration values and angular velocity values (Steps 501 and 502), the MPU 19 stores the calculated velocity values in the memory (Step 503). Next, the MPU 19 judges whether an operation signal from the switch of the button 13 is input (Step 504). When judged that an operation signal is not yet input (NO in Step 504), the MPU 19 transmits information on the velocity values as information on a movement amount of the pointer 2 (Step 505).

On the other hand, when the user presses the button 13 and an operation signal from the switch of the button 13 is input (YES in Step 504), the MPU 19 reads out velocity values of past n histories that are stored in the memory. Then, the MPU 19 calculates a combined vector of the read-out velocity values (Step 506). Typically, the MPU 19 obtains a sum $\Sigma V_x$ and sum $\Sigma V_y$ of first velocity values $V_x$ and second velocity values $V_y$ of past n histories that are stored in the memory and calculates a combined vector.

Upon calculating the combined vector, the MPU 19 calculates a combined vector tilt angle ξ' by Equation (6) below (Step 507).

$$\arctan(\Sigma V_y / \Sigma V_x) = \xi' \quad (6)$$

Upon calculating the combined vector tilt angle ξ', the MPU 19 judges whether the combined vector tilt angle ξ' is an angle within the first angle range (Step 508). When judged that the combined vector tilt angle ξ' is an angle within the first angle range (YES in Step 508), the MPU 19 widens the first angle range (Step 509) (angle range control means). In this case, the second angle range is narrowed. Upon widening the first angle range, the MPU 19 sets the first weighting factor α to be larger than the second weighting factor β (Step 510).

On the other hand, when judged that the combined vector tilt angle ξ' is not an angle within the first angle range (NO in Step 508), that is, when judged that the combined vector tilt angle ξ' is an angle within the second angle range, the MPU 19 narrows the first angle range (Step 511). In this case, the second angle range is widened. Upon narrowing the first angle range, the MPU 19 sets the first weighting factor α to be smaller than the second weighting factor β (Step 512).

Upon setting the weighting factors (α, β), the MPU 19 multiplies the first and second velocity values ($V_x$, $V_y$) by the first and second weighting factors (α, β), respectively, to thus calculate first and second modified velocity values ($V_x'$, $V_y'$) (Step 513).

Upon calculating the modified velocity values ($V_x'$, $V_y'$), the MPU 19 transmits information on the modified velocity values ($V_x'$, $V_y'$) to the control apparatus 40 as scroll information (Step 514).

FIG. 18 are diagrams showing temporal changes of ranges of the first angle range and the second angle range in a case where the processing shown in FIG. 17 is executed.

FIG. 18A is a diagram showing temporal changes of the first angle range and the second angle range in a case where the user operates the input apparatus 1 in the horizontal-axis (X'-axis) direction. FIG. 18B is a diagram showing temporal changes of the first angle range and the second angle range in a case where the user operates the input apparatus 1 in the vertical-axis (Y'-axis) direction.

As shown in FIG. 18A, when the user operates the input apparatus 1 in the horizontal-axis direction, the first angle range is gradually widened. As a result, when the user operates the input apparatus 1 in the horizontal-axis direction, it becomes easier with time to perform a scroll operation in the horizontal-axis direction with respect to the operation direction of the input apparatus 1.

As shown in FIG. 18B, when the user operates the input apparatus 1 in the vertical-axis direction, it becomes easier with time to perform a scroll operation in the vertical-axis direction with respect to the operation direction of the input apparatus 1.

For example, when the user holds the input apparatus 1 and moves it in the vertical-axis direction from the reference position, the user might swing his/her arm in an oblique direction from the vertical-axis direction. However, in the input apparatus 1 according to the fourth embodiment, the second angle range is in a widened state when an arm is swung. Therefore, even when the user swings an arm and operates the input apparatus 1 in an oblique direction, scroll in the vertical-axis direction is prioritized on the screen. Thus, since the first angle range and the second angle range are controlled variably in the input apparatus 1 according to the fourth embodiment, an operational feeing for the user in operating the image 6 displayed on the screen 3 can be additionally improved.

In the description on FIG. 17, a case where a combined vector is calculated by obtaining sums of first velocity values $V_x$ and second velocity values $V_y$ of past n histories in Step 506 has been described. However, it is also possible for the MPU 19 to calculate mean values of first velocity values $V_x$ and second velocity values $V_y$ of past n histories in Step 506. Alternatively, a moving average of the first and second velocity values may be obtained. Alternatively, a value passed through an LPF (Lowpass Filter) (hereinafter, referred to as LPF-passed value) may be used as the velocity value in Step 506. When an IIR (Infinite Impulse Response) filter or an FIR (Finite Impulse Response) filter is used as the LPF, the LPF-passed value only needs to be stored in the memory in Step 503.

Fifth Embodiment

Next, a fifth embodiment of the present invention will be described. In a description on the fifth embodiment, points different from those of the fourth embodiment will be mainly described.

Figure 19:
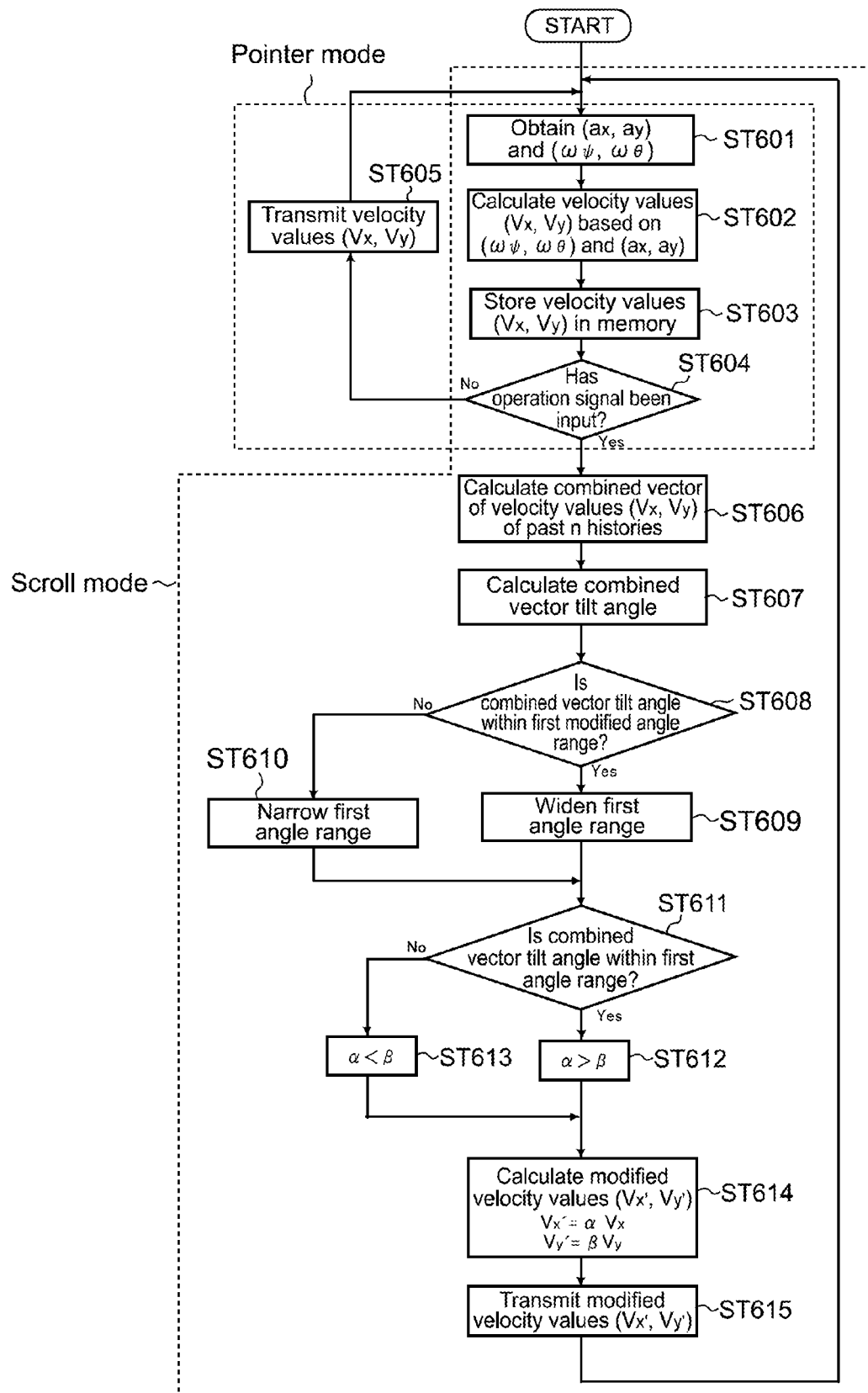
FIG. 19 is a flowchart showing an operation of the input apparatus according to another embodiment of the present invention.

FIG. 19 is a flowchart showing an operation of the input apparatus 1 according to the fifth embodiment.

As shown in FIG. 19, in Steps 601 to 605, processes that are the same as those of Steps 501 to 505 of FIG. 17 are executed, and by the user operating the input apparatus 1 in a state where the button 13 is not pressed, the pointer 2 moves on the screen 3.

When the user presses the button 13 and an operation signal from the switch is input (YES in Step 604), the MPU 19 reads out velocity values ($V_x$, $V_y$) of past n histories that are stored in the memory and calculates a combined vector of the read-out velocity values ($V_x$, $V_y$) (Step 606). Typically, the MPU 19 obtains sums of first velocity values and second velocity values of past n histories that are stored in the memory and calculates a combined vector.

Upon calculating the combined vector of the velocity values, the MPU 19 calculates a combined vector tilt angle ξ' by Equation (6) above (Step 607). Next, the MPU 19 judges whether the combined vector tilt angle ξ' is an angle within a first modified angle range (Step 608).

Figure 20:
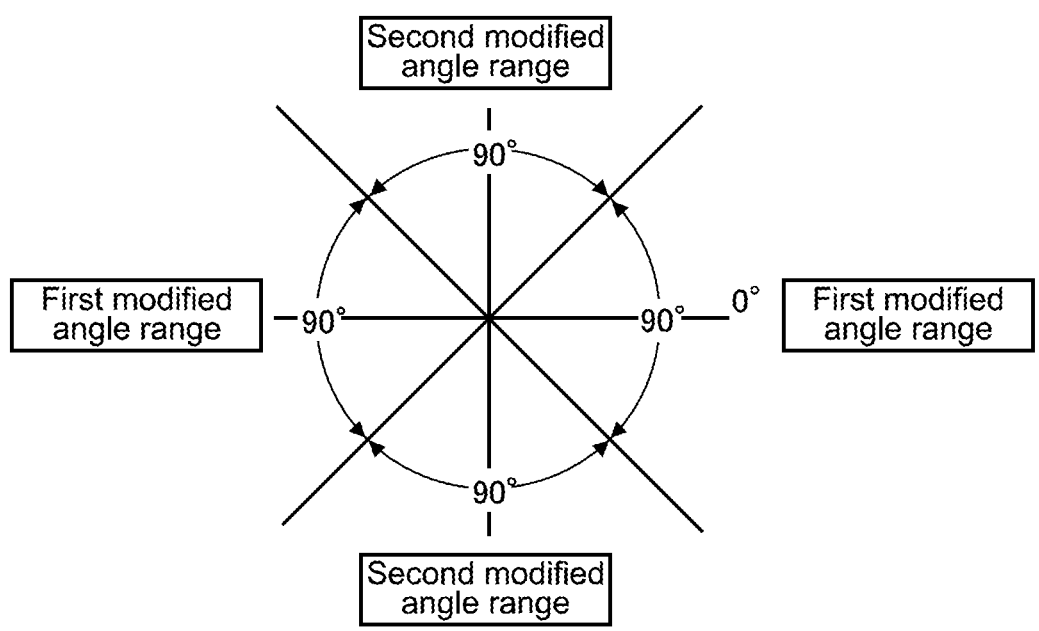
FIG. 20 is a diagram for explaining a first modified angle range and a second modified angle range.

FIG. 20 is a diagram for explaining the first modified angle range and second modified angle range. The first modified angle range is an angle range for changing the first angle range and the second angle range and indicates an angle range of, for example, ±45 degrees from 0 degree (or 180 degrees; same holds true for descriptions below). The second modified angle range is an angle range for changing the first angle range and the second angle range and indicates an angle range of, for example, ±45 degrees from 90 degrees (or 270 degrees; same holds true for descriptions below). The horizontal-axis direction within the modified angle ranges shown in FIG. 20 corresponds to a movement direction (operation direction) of the input apparatus 1 in the horizontal-axis direction, and the vertical-axis direction corresponds to the movement direction (operation direction) of the input apparatus 1 in the vertical-axis direction.

The first modified angle range and the second modified angle range are fixed and do not fluctuate by the combined vector tilt angle ξ'.

The first modified angle range and the second modified angle range are not limited to the range of 0±45 (or 90±45) degrees. The first modified angle range and the second modified angle range can be changed as appropriate.

It should be noted that it is also possible to judge whether the combined vector tilt angle ξ' is an angle within the second modified angle range in Step 608.

When judged that the combined vector tilt angle ξ' is an angle within the first modified angle range (YES in Step 608), the MPU 19 widens the first angle range (Step 609). In this case, the second angle range is narrowed. On the other hand, when judged that the combined vector tilt angle ξ' is not an angle within the first modified angle range (NO in Step 608), that is, when judged that the combined vector tilt angle ξ' is an angle within the second modified angle range, the MPU 19 narrows the first angle range (Step 610). In this case, the second angle range is widened.

Next, the MPU 19 judges whether the combined vector tilt angle ξ' is an angle within the first angle range (Step 611). When judged that the combined vector tilt angle ξ' is an angle within the first angle range (YES in Step 611), the MPU 19 sets the first weighting factor α to be larger than the second weighting factor β (Step 612).

On the other hand, when judged that the combined vector tilt angle ξ' is not an angle within the first angle range (NO in Step 611), that is, when judged that the combined vector tilt angle ξ' is an angle within the second angle range, the MPU 19 sets the first weighting factor α to be smaller than the second weighting factor β (Step 613).

Upon setting the weighting factors (α, β), the MPU 19 multiplies the first and second velocity values ($V_x$, $V_y$) by the first and second weighting factors (α, β), respectively, to thus calculate first and second modified velocity values ($V_x'$, $V_y'$) (Step 614).

Upon calculating the modified velocity values ($V_x'$, $V_y'$), the MPU 19 transmits information on the modified velocity values ($V_x'$, $V_y'$) to the control apparatus 40 as scroll information (Step 615).

In the fifth embodiment, the first angle range and the second angle range are controlled variably based on the first modified angle range and the second modified angle range as fixed values. As a result, the first angle range and the second angle range can be widened/narrowed as appropriate.

Sixth Embodiment

Next, a sixth embodiment of the present invention will be described.

The above embodiments have described a case where the scroll direction is biased in (restricted to) a uniaxial direction or biaxial directions on the screen. On the other hand, the sixth embodiment is different from the above embodiments in that the scroll direction is restricted to directions along four axes on the screen 3. Therefore, that point will mainly be described.

Figure 21:
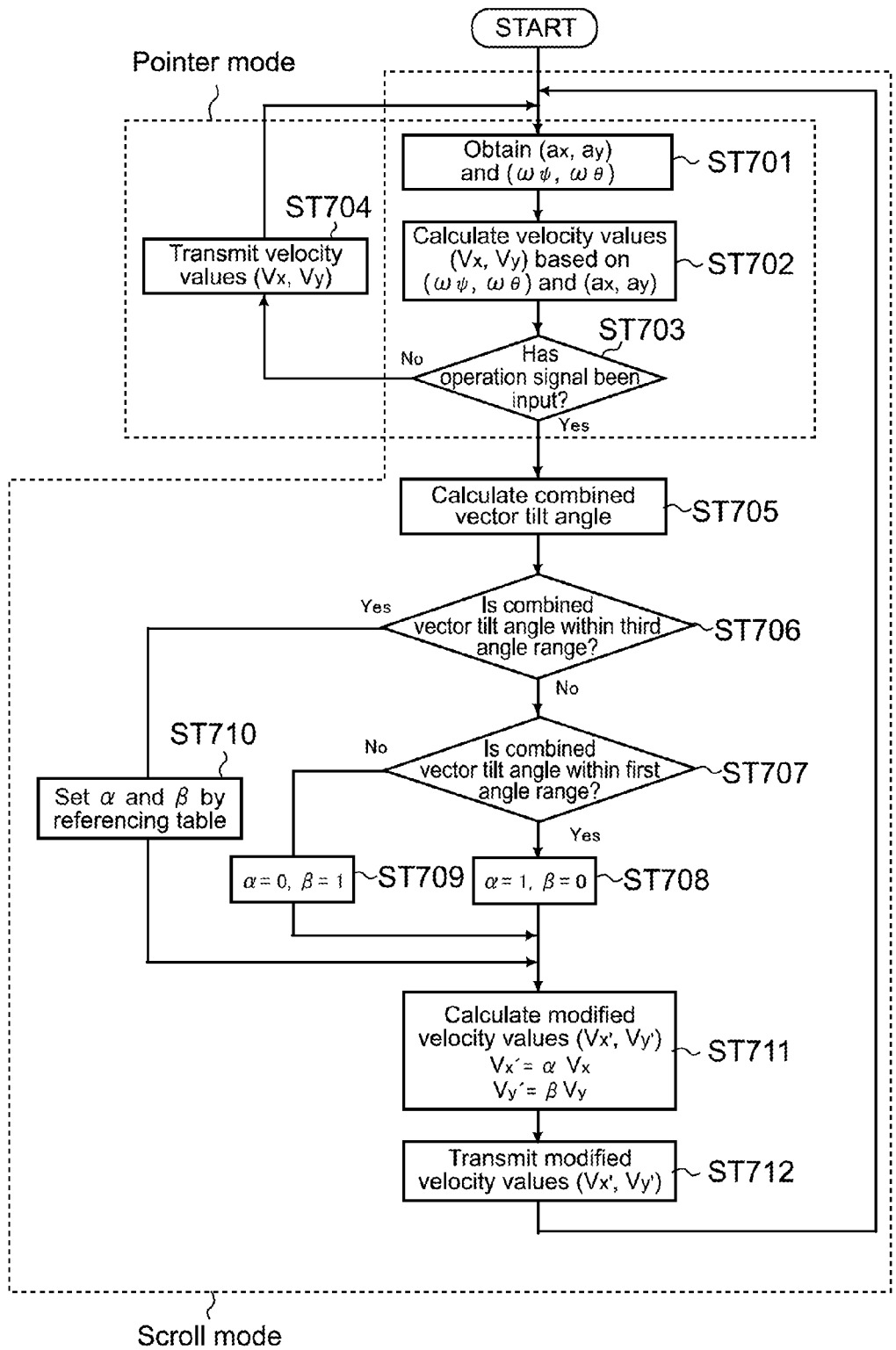
FIG. 21 is a flowchart showing an operation of the input apparatus according to another embodiment of the present invention.

FIG. 21 is a flowchart showing an operation of the input apparatus 1 according to this embodiment.

As shown in FIG. 21, in Steps 701 to 704, information on velocity values is transmitted as information on a movement amount of the pointer 2 when the button 13 is not pressed.

When the user presses the button 13 and an operation signal from the switch is input (YES in Step 703), the MPU 19 calculates a tilt angle ξ of a combined vector of velocity values ($V_x$, $V_y$) using Equation (5) above (Step 705).

Upon calculating the combined vector tilt angle ξ, the MPU 19 judges whether the combined vector tilt angle ξ is within a third angle range (Step 706).

Figure 22:
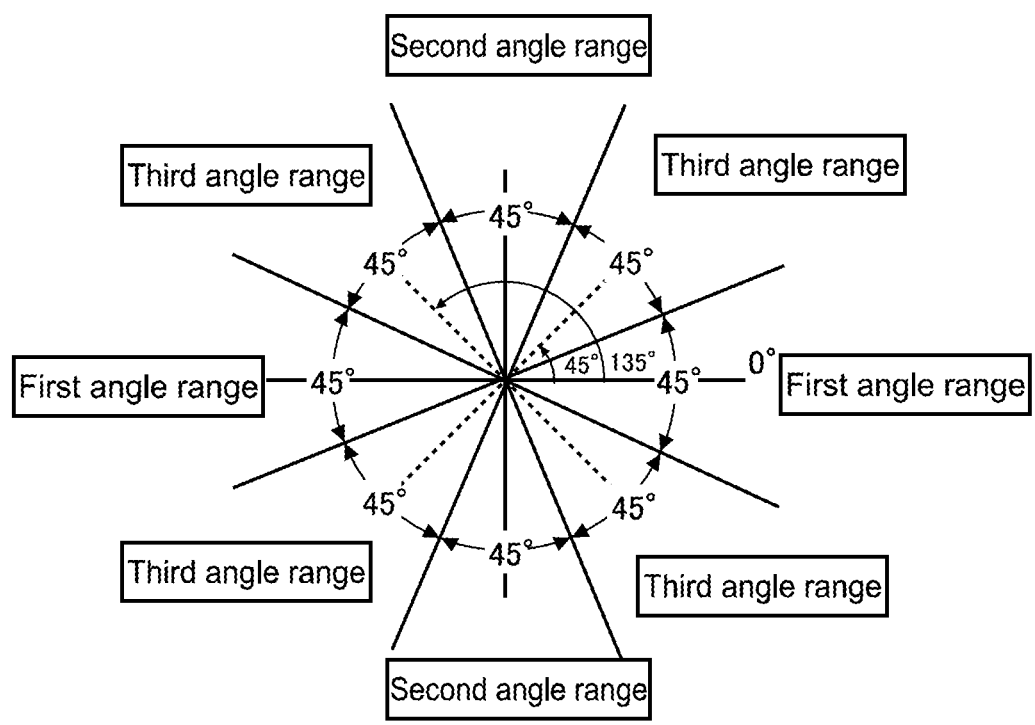
FIG. 22 is a diagram for explaining a third angle range.

FIG. 22 is a diagram for explaining the third angle range.

As shown in FIG. 22, in the input apparatus 1 of this embodiment, an angle range is divided into the first angle range, the second angle range, and the third angle range.

The first angle range is, for example, a range within 0±22.5 degrees or 180±22.5 degrees. The second angle range is, for example, a range within 90±22.5 degrees or 270±22.5 degrees. The third angle range is, for example, a range within 45±22.5 degrees, 135±22.5 degrees, 225±22.5 degrees, or 315±22.5 degrees. It should be noted that ranges of the first angle range, the second angle range, and the third angle range can be changed as appropriate. Angles to be a reference of the third angle range (broken lines of FIG. 22) can also be changed as appropriate. The horizontal-axis direction in the angle ranges shown in FIG. 22 corresponds to a movement direction (operation direction) of the input apparatus 1 in the horizontal-axis direction, and the vertical-axis direction corresponds to a movement direction (operation direction) of the input apparatus 1 in the vertical-axis direction.

When judged that the combined vector tilt angle ξ is within the third angle range (YES in Step 706), the MPU 19 references a table and sets the weighting factors (α, β) (Step 710). In this case, the weighting factors (α, β) read out from the table are not constant and are values determined in relation to velocity values ($V_x$, $V_y$). The weighting factors (α, β) are stored in the table as values for restricting the scroll direction to directions at angles of ±45 degrees from the vertical-axis direction on the screen. It should be noted that the weighting factors (α, β) set in Step 710 may be calculated by a program.

When judged in Step 706 that the combined vector tilt angle ξ is not an angle within the third angle range (NO in Step 706), the MPU 19 judges whether the combined vector tilt angle ξ is an angle within the first angle range (Step 707). When the combined vector tilt angle ξ is an angle within the first angle range (YES in Step 707), the MPU 19 sets the first weighting factor α to 1 and the second weighting factor β to 0 (Step 708).

On the other hand, when judged that the combined vector tilt angle ξ is not an angle within the first angle range (NO in Step 707), that is, when judged that the combined vector tilt angle ξ is an angle within the second angle range, the MPU 19 sets the first weighting factor α to 0 and the second weighting factor β to 1 (Step 709).

Upon setting the weighting factors (α, β), the MPU 19 multiplies the first and second velocity values ($V_x$, $V_y$) by the first and second weighting factors (α, β), respectively, to thus calculate first and second modified velocity values ($V_x'$, $V_y'$) (Step 711).

Upon calculating the modified velocity values ($V_x'$, $V_y'$), the MPU 19 transmits information on the modified velocity values ($V_x'$, $V_y'$) to the control apparatus 40 as scroll information (Step 712).

Figure 23:
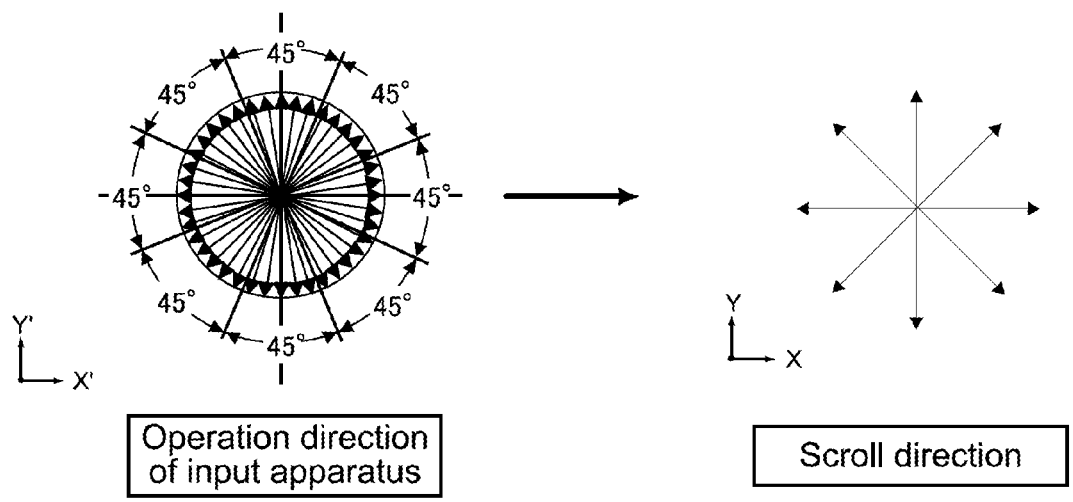
FIG. 23 are diagrams showing relationships between the operation directions of the input apparatus and scroll directions in a case where the processing shown in FIG. 21 is executed.

FIG. 23 is a diagram showing relationships between operation directions of the input apparatus 1 and scroll directions in a case where the processing shown in FIG. 21 is executed.

As shown in FIG. 23, when the user operates the input apparatus 1 in a direction within an angle range of ±22.5 degrees from a direction along the X'-axis direction, a scroll direction of the image 6 is restricted to the horizontal-axis (X-axis) direction on the screen. When the user operates the input apparatus 1 in a direction within an angle range of ±22.5 degrees from a direction along the Y'-axis direction, the scroll direction of the image 6 is restricted to the vertical-axis (Y-axis) direction on the screen. When the user operates the input apparatus 1 in a direction within an angle of ±22.5 degrees from a direction at an angle of +45 degrees from the X'-axis direction, the scroll direction of the image 6 is restricted to a direction at an angle of +45 degrees from the horizontal axis on the screen. When the user operates the input apparatus 1 in a direction within an angle of ±22.5 degrees from a direction at an angle of −45 degrees from the X'-axis direction, the scroll direction of the image 6 is restricted to a direction at an angle of −45 degrees from the horizontal axis on the screen.

As described above, in the sixth embodiment, the scroll direction is restricted to directions along four axes of the horizontal-axis direction, the vertical-axis direction, the direction at an angle of +45 degrees from the horizontal axis, and the direction at an angle of −45 degrees from the horizontal axis on the screen. As a result, an operational feeling in scroll operations in a case where the image 6 such as a map that is long in the vertical-axis direction and the horizontal-axis direction on the screen 3 as a whole is operated can be improved.

The sixth embodiment has been described assuming that the directions to which the scroll is restricted are the horizontal-axis direction, the vertical-axis direction, and the directions at angles of ±45 degrees from the horizontal-axis direction on the screen. However, the directions to which the scroll is restricted are not limited thereto. By setting the weighting factors ($\alpha$, $\beta$) stored in the table as appropriate in Step 710, the scroll direction can be restricted to various directions. Examples of the combination of directions to which scroll is restricted include a combination of the horizontal-axis direction, the vertical-axis direction, and directions at angles of ±30 degrees from the horizontal-axis direction and a combination of the horizontal-axis direction, the vertical-axis direction, and directions at angles of ±60 degrees from the horizontal-axis direction. It is of course possible to use other combinations.

The number of restriction axes on the screen 3 is also not limited to four (four axes). The number of restriction axes may be three (three axes) or five (five axes) or more.

The sixth embodiment has described a case where the scroll direction on the screen 3 is restricted. However, it is also possible to bias the scroll direction on the screen 3.

Moreover, the first angle range, the second angle range, and the third angle range may be controlled variably.

Seventh Embodiment

Next, the control system 100 according to a seventh embodiment of the present invention will be described.

In the seventh and subsequent embodiments, processing related to an operation direction of the input apparatus 1 and a direction in which an image is scrolled will be described.

In the 3-dimensional operation input apparatus 1, whether to scroll the image 6 in a direction in which the input apparatus 1 is operated or scroll the image 6 in an opposite direction from the direction in which the input apparatus 1 is operated sometimes becomes a problem.

Figure 24A:
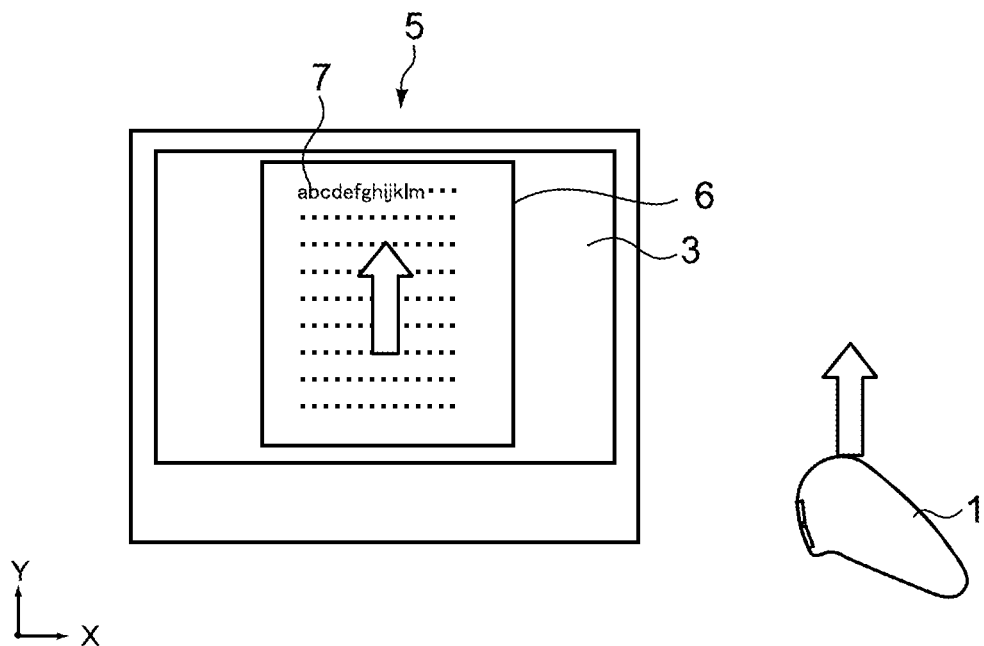
FIG. 24 are diagrams each showing a relationship between an operation direction of the input apparatus and a direction in which an image is scrolled.
Figure 24B:
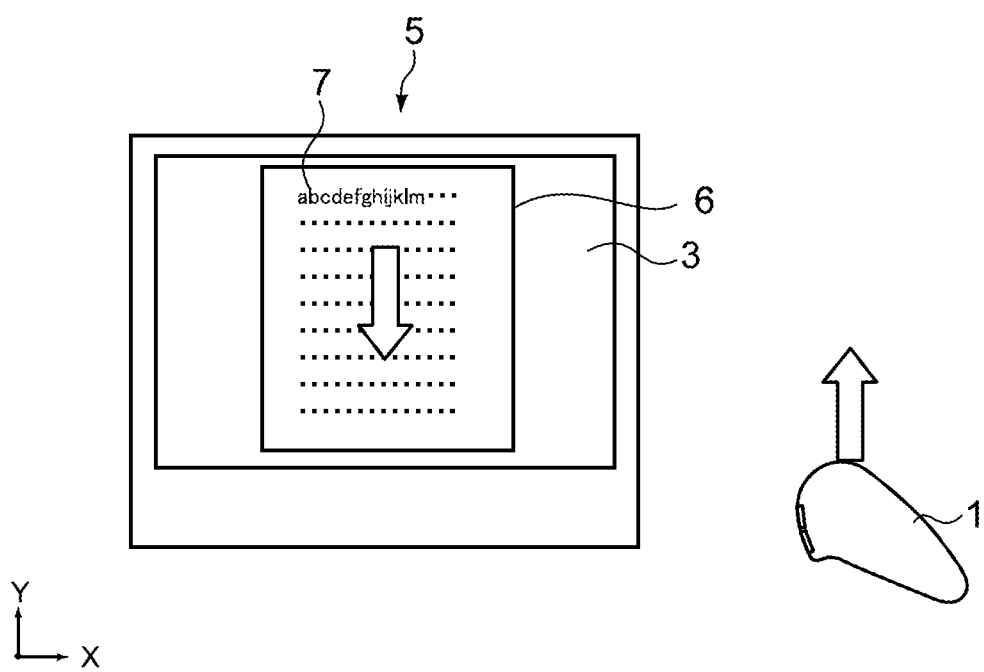

FIG. 24 are diagrams each showing a relationship between the operation direction of the input apparatus 1 and a direction in which the image 6 is scrolled. FIG. 24A is a diagram showing a case where the image 6 is scrolled in a direction in which the input apparatus 1 is operated, and FIG. 24B is a diagram showing a case where the image 6 is scrolled in an opposite direction from the direction in which the input apparatus 1 is operated.

The inventors of the present invention have conducted a user test, which revealed that there are both users who feel that scroll of an image in a direction in which the input apparatus 1 is operated provides a better operational feeling and users who feel that scroll of an image in an opposite direction from the direction in which the input apparatus 1 is operated provides a better operational feeling.

In this regard, the input apparatus 1 according to the seventh embodiment executes processing for improving an operational feeling regarding a direction of scrolling the image 6.

Figure 25:
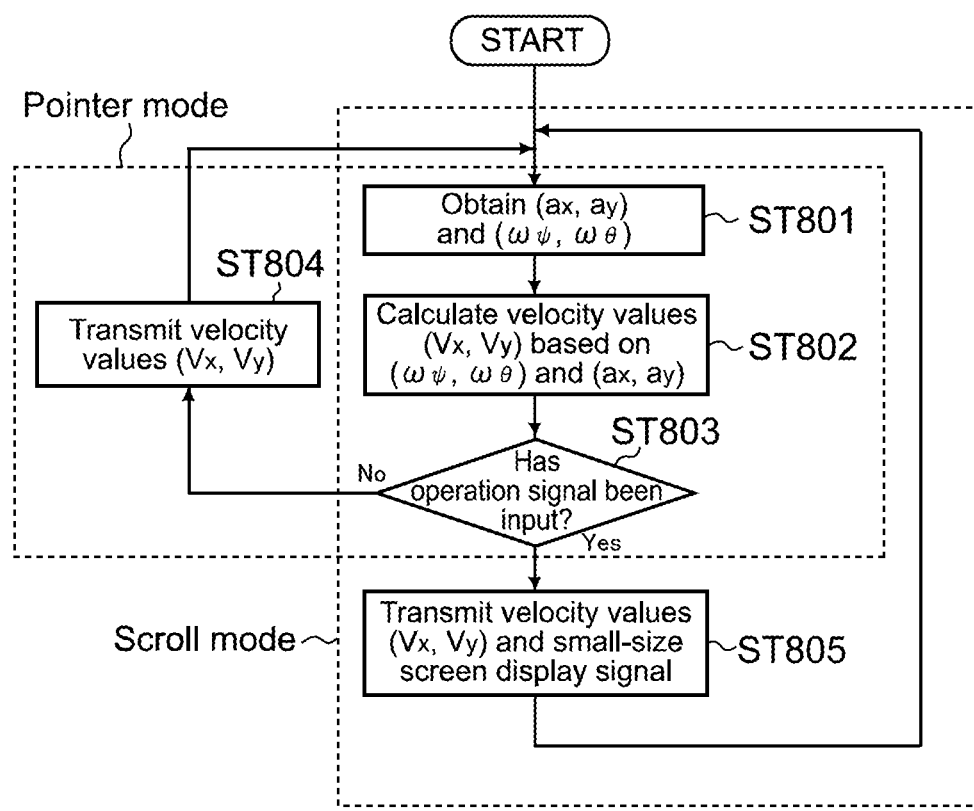
FIG. 25 is a flowchart showing an operation of the input apparatus of the control system according to another embodiment of the present invention.

FIG. 25 is a flowchart showing an operation of the input apparatus 1 of the control system 100 according to this embodiment.

As shown in FIG. 25, the input apparatus 1 calculates velocity values ($V_x$, $V_y$) based on acquired angular velocity values ($\omega_\psi$, $\omega_\theta$) and acceleration values ($a_x$, $a_y$) (Steps 801 and 802). Upon calculating the velocity values ($V_x$, $V_y$), the MPU 19 judges whether an operation signal from the switch provided to the button 13 is input (Step 803).

When judged that the operation signal is not input (NO in Step 803), the MPU 19 transmits information on the velocity values ($V_x$, $V_y$). In this case, the pointer 2 moves on the screen 3 in accordance with a movement of the input apparatus 1.

When the user presses the button 13, the input apparatus 1 transmits information on the velocity values ($V_x$, $V_y$) and a small-size screen display signal (Step 805).

Upon receiving the small-size screen display signal from the input apparatus 1, the MPU 35 of the control apparatus 40 controls display on the screen 3 so that a small-size screen 8 is displayed on the screen 3. Moreover, upon receiving the information on the velocity values ($V_x$, $V_y$), the MPU 35 of the control apparatus 40 controls display on the screen 3 so that the image 6 is scrolled at a velocity corresponding to the velocity values ($V_x$, $V_y$). It should be noted that since a small-size screen display signal is transmitted from the input apparatus 1 during the scroll mode, the MPU 35 can distinctively recognize the velocity values ($V_x$, $V_y$) transmitted in Step 804 and the velocity values ($V_x$, $V_y$) transmitted in Step 805.

Figure 26:
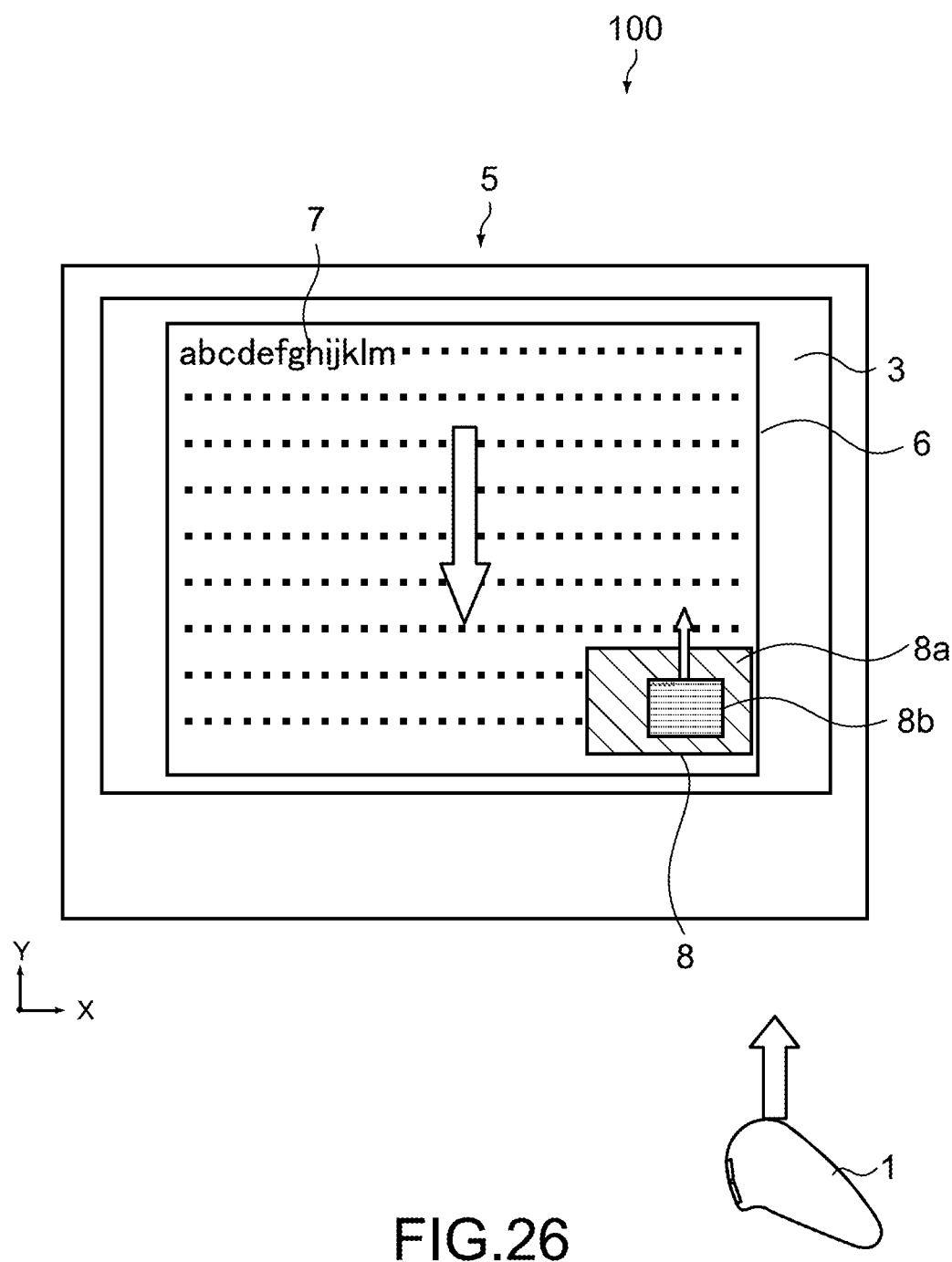
FIG. 26 is a diagram showing an image and a small-size screen displayed on the screen.

FIG. 26 is a diagram showing the image 6 and small-size screen 8 displayed on the screen. As shown in FIG. 26, the small-size screen 8 is displayed at a lower right-hand corner of the image 6, for example. It should be noted that a position at which the small-size screen 8 is displayed may be any position as long as it does not lower visibility of the image 6.

The small-size screen 8 is sectioned into a first area 8a (area in slashes in FIG. 26) corresponding to the entire image 6 and a second area 8b corresponding to a part of the image 6 currently being displayed on the screen.

When the user holds the input apparatus 1 and swings it upwardly from the reference position, the MPU 35 of the control apparatus 40 controls display so that the image 6 is scrolled downwardly at a velocity corresponding to the velocity values ($V_x$, $V_y$). In other words, the MPU 35 of the control apparatus 40 controls display on the screen 3 so that the image 6 is scrolled in an opposite direction from a vector direction of the velocity values ($V_x$, $V_y$). In addition, the MPU 35 of the control apparatus 40 controls display on the screen 3 so that the second area 8b moves upwardly in an area in which the small-size screen 8 is displayed. In other words, the MPU 35 of the control apparatus 40 controls display so that the image 6 moves in an opposite direction from a direction in which the image 6 is scrolled.

In other words, the MPU 35 of the control apparatus 40 controls display on the screen 3 so that the image 6 is scrolled in an opposite direction from the direction in which the input apparatus 1 is operated and the second area 8b moves in a direction in which the input apparatus 1 is operated.

By the processing as described above, the user can scroll an image displayed on a screen by merely operating the second area 8b in the small-size screen 8. Accordingly, since it becomes possible to perform scroll operations intuitively, an operational feeling in scroll operations can be improved. Moreover, since the small-size screen 8 is displayed while the button 13 is pressed (during scroll mode), it does not lower visibility during the pointer mode.

The input apparatus 1 may transmit modified velocity values ($V_x'$, $V_y'$) instead of velocity values ($V_x$, $V_y$) in Step 805. The processing described in the above embodiments can all be applied to this embodiment. As a result, since the scroll direction of the image 6 is biased in (restricted to) the horizontal-axis direction or the vertical-axis direction on the screen, an operational feeling in scroll operations can be additionally improved. The same holds true for modified examples to be described later.

First Modified Example

Next, a first modified example of the control system 100 according to the seventh embodiment will be described.

The input apparatus 1 of the control system 100 according to the first modified example transmits information on velocity values ($V_x$, $V_y$) and a scrollbar display signal in Step 805 shown in FIG. 25.

Upon receiving the scrollbar display signal, the control apparatus 40 displays a scrollbar 9 on the screen 3.

Figure 27:
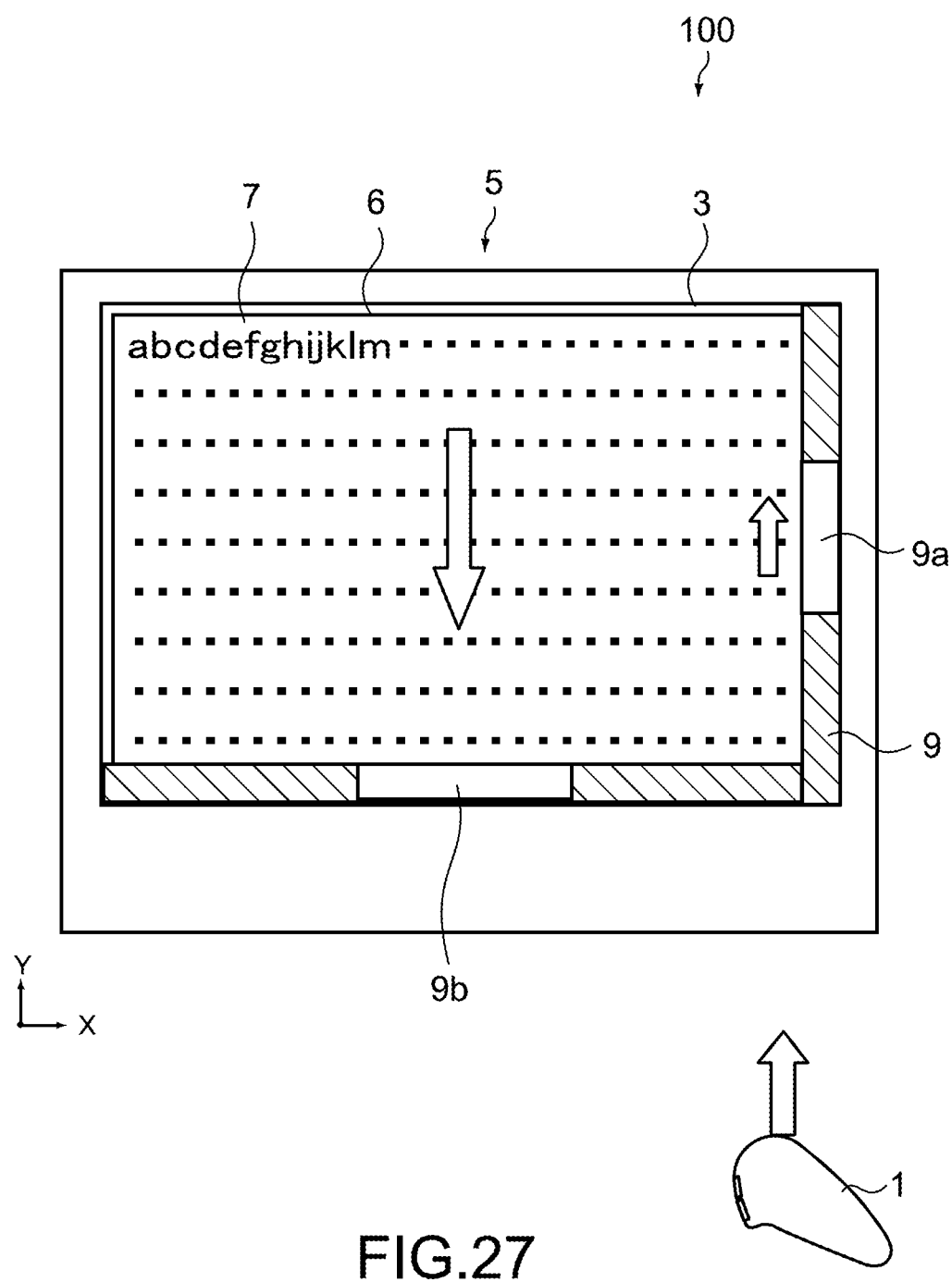
FIG. 27 is a diagram showing an image and scrollbars displayed on the screen.

FIG. 27 is a diagram showing the image 6 and scrollbar 9 displayed on the screen 3. As shown in FIG. 27, the scrollbar 9 is displayed at a lower end and rightward end on the screen 3. It should be noted that positions at which the scrollbar 9 is displayed may be any position as long as it does not lower visibility of the image 6.

The scrollbar 9 includes an ordinate-axis scrollbar 9a and an abscissa-axis scrollbar 9b.

When the user holds the input apparatus 1 and swings it upwardly from the reference position, the MPU 35 of the control apparatus 40 controls display so that the image 6 is scrolled downwardly at a velocity corresponding to velocity values ($V_x$, $V_y$) transmitted in Step 805. In other words, the MPU 35 of the control apparatus 40 controls display on the screen 3 so that the image 6 is scrolled in an opposite direction from a vector direction of the velocity values ($V_x$, $V_y$). Moreover, the MPU 35 of the control apparatus 40 controls display on the screen 3 so that the ordinate-axis scrollbar 9a moves upwardly. Specifically, the MPU 35 of the control apparatus 40 controls display so that the ordinate-axis scrollbar 9a moves in an opposite direction from the direction in which the image 6 is scrolled.

When the user moves the input apparatus 1 in a right-hand direction on the screen 3 from the reference position, the image is scrolled in a left-hand direction, and the abscissa-axis scrollbar 9b is moved in the right-hand direction on the screen 3.

In other words, the MPU 35 of the control apparatus 40 controls display on the screen 3 so that the image 6 is scrolled in an opposite direction from a direction in which the input apparatus 1 is operated and the ordinate-axis scrollbar 9a and the abscissa-axis scrollbar 9b are moved in directions in which the input apparatus 1 is operated.

By the processing as described above, the user can scroll the image 6 displayed on the screen by merely operating the scrollbar 9, with the result that an operational feeling in scroll operations can be improved. Moreover, since the scrollbar 9 is displayed while the button 13 is pressed (during scroll mode), it does not lower visibility during the pointer mode.

Second Modified Example

Next, a second modified example of the control system 100 according to the seventh embodiment of the present invention will be described.

The input apparatus 1 of the control system 100 according to the second modified example transmits information on velocity values ($V_x$, $V_y$) and a reference point display signal in Step 805 shown in FIG. 25.

Upon receiving the reference point display signal, the control apparatus 40 displays a reference point 43 on the image 6 when the pointer 2 displayed on the screen 3 is positioned on the image 6, for example.

Figure 28:
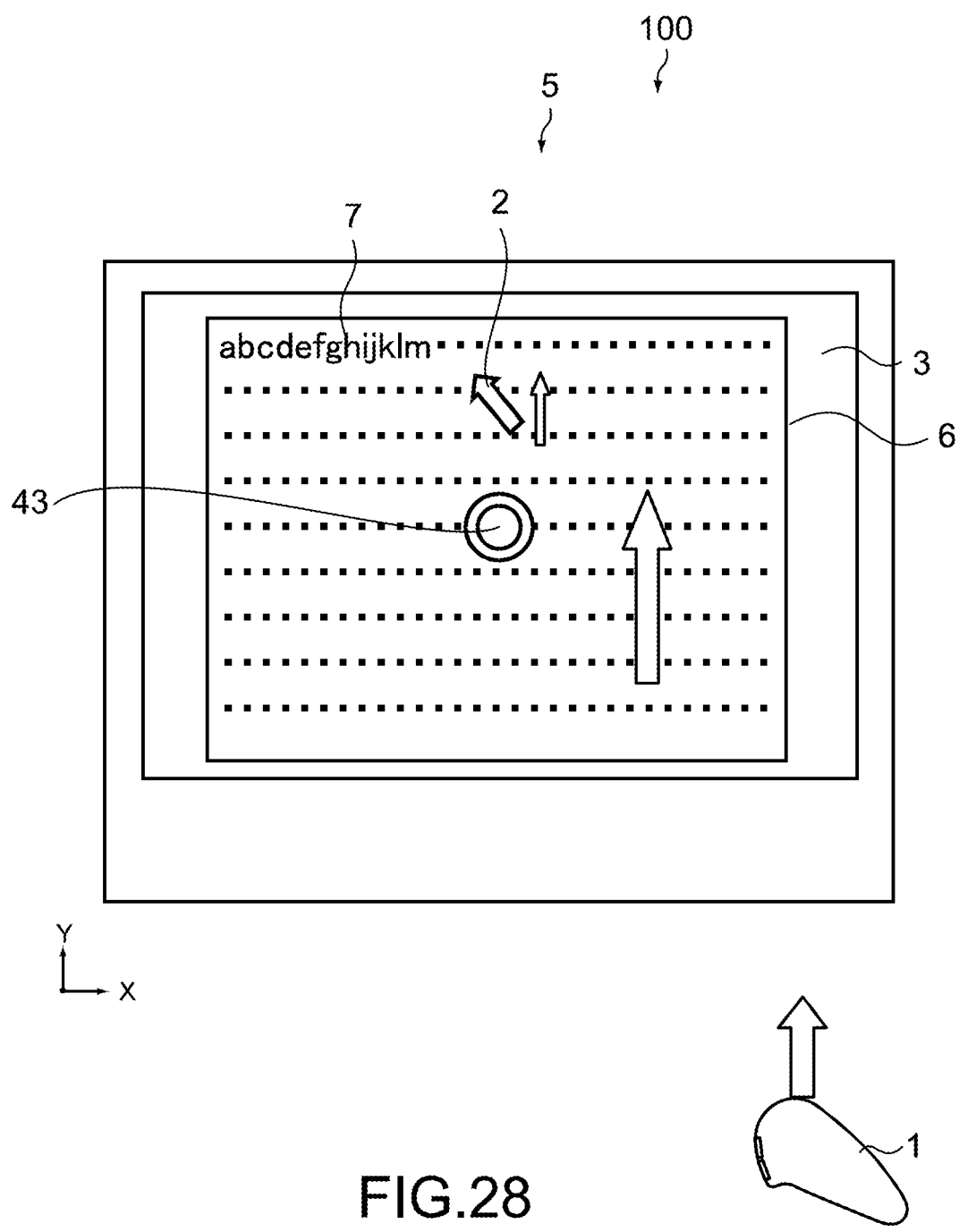
FIG. 28 is a diagram showing an image and a reference point displayed on the screen.

FIG. 28 is a diagram showing the image 6 and reference point 43 displayed on the screen 3. The reference point 43 is displayed as, for example, a circular point. It should be noted that a shape of the reference point 43 is not particularly limited. The reference point 43 is displayed at a position at which the pointer 2 is positioned at a time the button 13 is pressed.

Upon displaying the reference point 43 on the screen 3, the MPU 35 of the control apparatus 40 generates coordinate values of the pointer 2 based on information on velocity values ($V_x$, $V_y$) transmitted from the input apparatus 1 in Step 805. Then, the MPU 35 of the control apparatus 40 controls display so that the pointer 2 moves on the screen. In other words, in the control system 100 according to the second modified example, the pointer 2 also moves during the scroll mode.

Moreover, the MPU 35 of the control apparatus 40 adds the velocity values ($V_x$, $V_y$) transmitted from the input apparatus 1 in Step 805 to thus generate integration values.

The MPU 35 of the control apparatus 40 controls display on the screen so that the image 6 is scrolled at a velocity corresponding to the integration values.

When the user holds the input apparatus 1 and swings it upwardly from the reference position, the pointer 2 is moved upwardly on the screen 3 and the image 6 is scrolled upwardly. In other words, the MPU 35 of the control apparatus 40 controls display on the screen 3 so that the pointer 2 moves in the same direction as a vector direction of the velocity values ($V_x$, $V_y$) and the image 6 is scrolled in the same direction as the vector direction of the velocity values ($V_x$, $V_y$).

By the processing as described above, the user can scroll the image 6 with the pointer 2 as a guide. As a result, since intuitional operations can be made, an operational feeling can be improved.

Various Modified Examples

The embodiment of the present invention is not limited to the above embodiments and various modifications can be made.

For example, it is possible to execute processing that inhibits, when the button 13 is started to be pressed, an image displayed on the screen 3 from being scrolled during a predetermined time period (first time period) since the start of the press. Accordingly, it is possible to prevent the image from being scrolled in a direction unintended by the user due to the input apparatus being moved when the user presses the button 13.

The present invention is applicable to input apparatuses such as a planar-operation-type mouse, a touchpad, a joystick, and a pen tablet. Alternatively, the present invention may be applied to a slide-resistance-type input apparatus that detects a movement of an operation section inside an opening formed on a casing by a slide resistance. Alternatively, the present invention may be applied to an optical input apparatus that calculates a movement amount and operation direction of a finger of a user by irradiating light onto a semicircular operation section provided at an upper portion of a casing and detecting reflected light. Alternatively, the present invention may be applied to an electronic apparatus including any of the input apparatuses described above (e.g., laptop PC including touchpad).

The present invention may be applied to a handheld apparatus that includes a display section, for example. In this case, an image displayed on the display section is scrolled when the user moves a main body of the handheld apparatus. Alternatively, the user moves the pointer by moving the main body of the handheld apparatus. Examples of the handheld apparatus include a PDA (Personal Digital Assistance), a cellular phone, a portable music player, and a digital camera.

The input apparatus 1 according to the above embodiments has transmitted input information to the control apparatus 40 wirelessly. However, the input information may be transmitted by wire.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The above embodiments have described about the biaxial acceleration sensor unit and the biaxial angular velocity sensor unit. However, the present invention is not limited thereto, and the input apparatus 1 may include, for example, acceleration sensors of three orthogonal axes and angular velocity sensors of three orthogonal axes, and even with only one of the above, the processing shown in the above embodiments can be realized. Alternatively, an embodiment in which the input apparatus 1 includes a uniaxial acceleration sensor or a uniaxial angular velocity sensor is also conceivable. When provided with the uniaxial acceleration sensor or uniaxial angular velocity sensor, typically a screen on which a plurality of GUIs as pointing targets of the pointer 2 displayed on the screen 3 are arranged uniaxially is conceivable.

Alternatively, the input apparatus 1 may include a geomagnetic sensor, an image sensor, and the like instead of the acceleration sensors and the angular velocity sensors.

The detection axes of each of the angular velocity sensor unit 15 and the acceleration sensor unit 16 of the sensor unit 17 do not necessarily need to be mutually orthogonal like the X' axis and the Y' axis described above. In this case, accelerations respectively projected in the mutually-orthogonal axial directions can be obtained by a calculation that uses a trigonometric function. Similarly, angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, accelerations and angular velocities with respect to the respective axes can be obtained by a calculation that uses the trigonometric function.

In the above embodiments, the case where the input apparatus 1 is operated 3-dimensionally has been described. However, the present invention is not limited thereto, and the input apparatus may be operated while a part of the casing 10 is in contact with a table, for example.

The present application contains subject matter related to that disclosed in Japanese Priority Patent Application JP 2008-331617 filed in the Japan Patent Office on Dec. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input apparatus, comprising:
   a detection unit configured to detect a movement amount of a user operation in an arbitrary three-dimensional direction;
   a processing unit configured to:
      change a ratio between a first movement amount and a second movement amount, the first movement amount in a first operation direction corresponding to a first direction on a screen, and the second movement amount in a second operation direction corresponding to a second direction on the screen, the second direction being different from the first direction, the first movement amount and the second movement amount corresponding to a detection value of the movement amount detected by the detection section;
   wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction, and
   wherein the first range of acceptable angles is a first angle range and the second range of acceptable angles is a second angle range; and
   determine whether to perform widening or narrowing of the first angle range and the second angle range based on the direction of the user operation,
   wherein the processing unit controls the first angle range and the second angle range so that the first angle range is widened when the direction of the user operation is within a first modified angle range from the first operation direction and the second angle range is widened when the direction of the user operation is within a second modified angle range from the second operation direction; and
   a transmission unit configured to transmit, based at least in part on the first movement amount and the second movement amount whose ratio has been changed, scroll information of an image displayed on the screen.

2. The input apparatus according to claim 1, wherein the processing unit is further configured to:
   determine the judged direction of the user operation based on the detected detection value, and
   change the ratio of the first movement amount to the second movement amount in accordance with the judged direction of the user operation.

3. The input apparatus according to claim 1, wherein the second angle range is wider than the first angle range.

4. The input apparatus according to claim 1, wherein the processing unit is configured to change the ratio between the first movement amount and the second movement amount so that the scroll direction of the image is restricted to at least the first direction on the screen and the second direction on the screen.

5. The input apparatus according to claim 4, wherein the processing unit is configured to change the ratio between the first movement amount and the second movement amount so that the scroll direction of the image is restricted to directions that respectively form predetermined angles with respect to the first direction on the screen and the second direction on the screen.

6. The input apparatus according to claim 1, wherein the detection unit comprises a sensor that detects the user operation in a three-dimensional direction.

7. The input apparatus according to claim 6, wherein the sensor comprises a gyroscopic sensor.

8. The input apparatus according to claim 6, wherein the sensor comprises an accelerometer.

9. The input apparatus according to claim 6, wherein the sensor comprises an image sensor.

10. A control apparatus controlling display of scroll of an image displayed on a screen in accordance with information transmitted from an input apparatus, the input apparatus comprising a detection unit configured to detect a movement amount of a user operation in an arbitrary three-dimensional direction and a transmission unit configured to transmit the information, wherein the information is related to a detection value of the movement amount detected by the detection section, the control apparatus comprising:
  a reception unit configured to receive the information;
  a processing unit configured to:
    change a ratio between a first movement amount and a second movement amount, the first movement amount in a first operation direction corresponding to a first direction on the screen, and the second movement amount in a second operation direction corresponding to a second direction on the screen, the second direction being different from the first direction, the first movement amount and the second movement amount corresponding to the detection value;
    wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction, and
    wherein the first range of acceptable angles is a first angle range and the second range of acceptable angles is a second angle range; and
    determine whether to perform widening or narrowing of the first angle range and the second angle range based on the direction of the user operation; and
  a display control unit configured to control the display on the screen so that the image displayed on the screen is scrolled in accordance with the first movement amount and the second movement amount whose ratio has been changed.

11. The control apparatus according to claim 10, wherein the processing unit is configured to control the first angle range and the second angle range so that the first angle range is widened when the direction of the user operation is within a first modified angle range from the first operation direction and the second angle range is widened when the direction of the user operation is within a second modified angle range from the second operation direction.

12. A control system, comprising:
  an input apparatus including
  a detection unit configured to detect a movement amount of a user operation in an arbitrary three-dimensional direction,
  a processing unit configured to:
    change a ratio between a first movement amount and a second movement amount, the first movement amount in a first operation direction corresponding to a first direction on a screen, and the second movement amount in a second operation direction corresponding to a second direction on the screen, the second direction being different from the first direction, the first movement amount and the second movement amount corresponding to a detection value of the movement amount detected by the detection section,
    wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction, and
    wherein the first range of acceptable angles is a first angle range and the second range of acceptable angles is a second angle range; and
    determine whether to perform widening or narrowing of the first angle range and the second angle range based on the direction of the user operation; and
  a transmission unit configured to transmit, based on the first movement amount and the second movement amount whose ratio has been changed, scroll information of an image displayed on the screen; and
  a control apparatus including
  a reception unit configured to receive the scroll information, and
  a display control unit configured to control a display on the screen so that the image displayed on the screen is scrolled in accordance with the first movement amount and the second movement amount whose ratio has been changed.

13. A control system, comprising:
  an input apparatus including
  a detection unit configured to detect a movement amount of a user operation in an arbitrary three-dimensional direction, and
  a transmission unit configured to transmit information related to a detection value of the movement amount detected by the detection unit; and
  a control apparatus including
  a reception unit configured to receive the information,
  a processing unit configured to:
    change a ratio between a first movement amount and a second movement amount, the first movement amount in a first operation direction corresponding to a first direction on a screen, and the second movement amount in a second operation direction corresponding to a second direction on the screen, the second direction being different from the first direction, the first movement amount and the second movement amount corresponding to the detection value,
wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction,
wherein the first range of acceptable angles is a first angle range and the second range of acceptable angles is a second angle range; and
control whether to perform widening or narrowing of the first angle range and the second angle range based on the direction of the user operation; and
a display control unit configured to control a display on the screen so that an image displayed on the screen is scrolled in accordance with the first movement amount and the second movement amount whose ratio has been changed.

14. An electronic apparatus, comprising:
a display unit configured to display a screen;
a detection unit configured to detect a movement amount of a user operation in an arbitrary three-dimensional direction;
a processing unit configured to:
change a ratio between a first movement amount and a second movement amount, the first movement amount in a first operation direction corresponding to a first direction on the screen, and the second movement amount in a second operation direction corresponding to a second direction on the screen, the second direction being different from the first direction, the first movement amount and the second movement amount corresponding to a detection value of the movement amount detected by the detection section;
wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction,
wherein the first range of acceptable angles is a first angle range and the second range of acceptable angles is a second angle range; and
determine whether to perform widening or narrowing of the first angle range and the second angle range based on the direction of the user operation; and
a display control unit configured to control a display on the screen so that an image displayed on the screen is scrolled in accordance with the first movement amount and the second movement amount whose ratio has been changed.

15. A control method, comprising:
detecting a movement amount of a user operation in an arbitrary three-dimensional direction;
changing a ratio between a first movement amount and a second movement amount, the first movement amount in a first operation direction corresponding to a first direction on a screen, and the second movement amount in a second operation direction corresponding to a second direction on the screen, the second direction being different from the first direction, the first movement amount and the second movement amount corresponding to a detection value of the detected movement amount; and
controlling display on the screen so that an image displayed on the screen is scrolled in accordance with the first movement amount and the second movement amount whose ratio has been changed;
wherein changing the ratio between the first movement amount and the second movement amount further comprises, when an angle of a judged direction of the user operation is within a first range of acceptable angles from the first operation direction, the first range of acceptable angles being a first angle range:
biasing a scroll direction of the image in the first direction;
changing the ratio so that, when the angle of the judged direction of the user operation is within a second range of acceptable angles from the second operation direction, the scroll direction is biased in the second direction, the second range of acceptable angles being a second angle range; and
determining whether to perform widening or narrowing of the first angle range and the second angle range based on the direction of the user operation.

16. The control method according to claim 15, wherein controlling the first angle range and the second angle range comprises controlling so that the first angle range is widened when the direction of the user operation is within a first modified angle range from the first operation direction and the second angle range is widened when the direction of the user operation is within a second modified angle range from the second operation direction.

17. An input apparatus, comprising:
a detection unit configured to detect a movement amount of a user operation in an arbitrary three-dimensional direction;
a processing unit configured to:
change a ratio between a first movement amount and a second movement amount, the first movement amount in a first operation direction corresponding to a first direction on a screen, and the second movement amount in a second operation direction corresponding to a second direction on the screen, the second direction being different from the first direction, the first movement amount and the second movement amount corresponding to a detection value of the movement amount detected by the detection section;
wherein the processing unit changes the ratio between the first movement amount and the second movement amount so that, when an angle of a judged direction of the user operation is within a first range of acceptable angles from the first operation direction, a scroll direction of the image is biased in the first direction, and changes the ratio so that, when the angle of the judged direction of the user operation is within a second range of acceptable angles from the second operation direction, the scroll direction is biased in the second direction, wherein the first range of acceptable angles is a first angle range and the second range of acceptable angles is a second angle range; and determine whether to perform widening or narrowing of the first angle range and the second angle range based on the direction of the user operation; and a transmission unit to transmit, based on the first movement amount and the second movement amount whose ratio has been changed, scroll information of an image displayed on the screen.

* * * * *